United States Patent
Kijima et al.

(10) Patent No.: US 6,882,366 B1
(45) Date of Patent: Apr. 19, 2005

(54) ELECTRONIC IMAGING SYSTEM

(75) Inventors: Takayuki Kijima, Akiruno (JP); Junzo Sakurai, Koganei (JP); Dai Kawase, Hino (JP); Hiroyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/009,768

(22) Filed: Jan. 20, 1998

(30) Foreign Application Priority Data

Jan. 20, 1997 (JP) .................................................. 9-7831

(51) Int. Cl.$^7$ ................................................. H04N 3/14
(52) U.S. Cl. ..................... 348/294; 348/320; 348/218.1
(58) Field of Search ............................... 348/207, 220, 348/221, 229, 294, 297, 308, 333.01, 311, 315, 320, 322, 272, 273, 207.99, 220.1, 221.1, 229.1, 230.1

(56) References Cited

U.S. PATENT DOCUMENTS

| | | | | |
|---|---|---|---|---|
| 5,880,781 A | * | 3/1999 | Udagawa et al. | 348/279 |
| 5,909,247 A | * | 6/1999 | Hosokai et al. | 348/302 |
| 6,031,569 A | * | 2/2000 | Nobuoka et al. | 348/220.1 |
| 6,084,634 A | * | 7/2000 | Inagaki et al. | 348/294 |
| 6,529,236 B1 | * | 3/2003 | Watanabe | 348/230.1 |
| 6,580,457 B1 | * | 6/2003 | Armstrong et al. | 348/317 |
| 6,661,451 B1 | * | 12/2003 | Kijima et al. | 348/220.1 |

* cited by examiner

*Primary Examiner*—Aung Moe
(74) *Attorney, Agent, or Firm*—Pillsbury Winthrop LLP

(57) ABSTRACT

An electronic imaging system includes a CCD image sensor arrangement having a two dimensional array of pixels. The pixel array converts light incident thereon to an electric signal. The pixels are arranged in a plurality of horizontal rows or lines, the lines being arranged vertically. A control arrangement selectively controls operational modes of the system. One mode provides for sequential scan reading out of pixel signals for entire lines of the CCD for still picture recording. Another mode provides for reading out pixel signals concerning k (k is a positive integer) vertically continuous lines of the CCD for still picture recording or dynamic image processing. Thus it is possible to provide a high pixel density solid-state image sensor output at a high frame rate without use of any high drive frequency.

11 Claims, 23 Drawing Sheets

K LINE

K LINE

K LINE

K LINE

K LINE

K LINE

FIG. 24 (PRIOR ART)
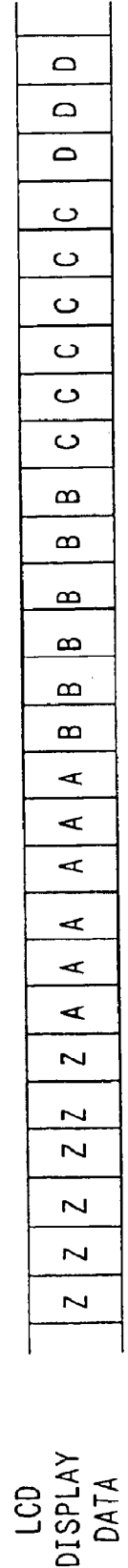

ELECTRONIC IMAGING SYSTEM

BACKGROUND OF THE INVENTION

The present invention relates to an electronic imaging system and, more particularly, to electronic imaging apparatus, in which pixel signals are read out from a solid-state image sensor having a two-dimensional pixel array and used for recording a still picture or for dynamic image processing.

With recent advancement of fine processing techniques, solid-state image sensors such as CCDs for converting optical image to electric image signal, have a trend for increasing pixel density.

In view of the pixel density, as such high pixel density CCD, an inter-line solid-state image sensor with a pixel density corresponding to, for instance, 1,000,000 pixels, is capable of providing the image at a frame rate of 10 to 15 frames per second when driven by sequential scan driving at a frequency of 20 MHz (megahertz) or below.

The frame rate noted above, however, is not sufficient for the case of using the image data as dynamic image data. Specifically, with such image data an electronic imaging system, which employs the above solid-state imaging element and includes a control system requiring dynamic image data, cannot fast execute such processes as auto focus (AF) control, auto exposure (AF) control and auto white balance (AWB) control.

This will now be described with reference FIG. 24 of the accompanying drawings.

Referring to FIG. 24, which is a time chart illustrating CCD output data and liquid crystal display data obtainable by prior art CCD drive means, labeled 1/60 VD is a vertical sync signal with a cycle time of 1/60 seconds. Under control of this vertical sync signal, output data illustrated as A, B, C, D, E, . . . are obtained from a CCD at a frame rate of 10 frames per second.

In a system with a liquid crystal display, it is necessary to set a frame rate of about 60 frames per second for liquid crystal display driving. Otherwise, satisfactory display cannot be obtained for such reason as the reaction of crystal. To solve this problem, the display frame rate for display is increased by storing each frame of CCD output data in a memory or the like and providing the stored frame data a certain number of times.

Specifically, data A, for instance, outputted from the CCD and stored in the memory, is provided as liquid crystal display data repeatedly, six times, for instance. Since the data A is provided at a rate of 10 frames per second as noted above, the liquid crystal display data is provided at a rate of 60 frames per second.

The above drive means always require provision of a memory or like means. From the standpoint of the cost, however, it is not desirable to use an expensive memory for the sole frame rate control purpose.

Another problem is encountered when using the above CCD output data as control data for processing with high rate dynamic image data, for instance AF (auto focus) data as shown in parentheses as CCD output data in FIG. 24, or as control data for AE or AWB.

With a single frame of CCD output data, AF control, for instance, cannot always be obtained. Heretofore, AF has been controlled by using a plurality of frames. Dynamic image data at the frame rate of only 10 frames per second as noted above, requires long AF time.

Particularly, time-consuming AF, AE or AWB is very disadvantageous for an electronic still camera used as electronic imaging system for taking still pictures, because it is very important with such camera to time shutter chances without missing. In this viewpoint, the time-consuming AF, AE or AWB is very disadvantageous.

Besides, where the obtainable frame rate is only about 10 frames per second as noted above, it is necessary to execute the AF, AE and AWB controls in parallel processes in order for the controls to be made in due time. A memory or the like should be used or the circuit scale should be increased, which is disadvantageous from the standpoint of the cost.

In order to increase the frame rate without use of any memory, it is conceivable to have resort to a thin-down scan read means. In the prior art, thin-down scan reading is made in a manner, which will now be described with reference to FIGS. 25 and 26.

FIG. 25 is a view illustrating the configuration of an example of color filter in a prior art solid-state image sensor.

The line sequential filter configuration shown in FIG. 25 is well known as Bayer array of original colors. In this array, a 1-st line consists of alternate red (R) and green (G) pixels. A 2-nd line consists of alternate green (G) and blue (B) pixels. Subsequent odd lines have the same configuration as the 1-st line, and subsequent even lines have the same configuration as the 2-nd line. This Bayer array of original colors is a color difference line sequential filter array, which is usually used in a commonly called whole pixel read CCD.

FIG. 26 illustrates a purely every other line thin-down scan, which is usually conceivable for increasing the frame rate in a CCD by a thinning-down process.

By such thin-down scan read, however, only odd lines, for instance 1-st, 3-rd, 5-th, etc. lines, are read out. Therefore, with a CCD having the Bayer array filter configuration as shown in FIG. 25, only RG lines (containing red information) shown as (CR) in FIG. 26, are read out. In other words, blue (B) signal (containing blue information) present in even lines (as shown as (CB) in FIG. 26) cannot be obtained.

As shown above, the purely every other line thin-down scan read for increasing the frame rate cannot permit all of G, R and B signals to be obtained at all times for increasing the frame rate. Therefore, the CCD output data cannot be used as color data for the liquid crystal display purpose, that is, it cannot be suitably used for an electronic still camera which has a liquid crystal display.

As described above, for driving a high pixel density inter-line solid-state image sensor at a frame rate suitable for dynamic image signal processing, a high drive frequency is necessary, and the above frame rate is insufficient in sequential scan driving at a frequency of 20 MHz or below.

The thin-down scan is conceived to solve this problem. As described before, however, in an whole pixel CCD image sensor which usually uses a color filter having a Bayer array or like color difference line sequential array, the thin-down scan gives rise to missing of color signal, making it impossible to obtain necessary color signal.

SUMMARY OF THE INVENTION

The present invention was made in view of the above circumstances, and has an object of providing an electronic imaging system, which can provide a high frame rate output from a solid-state image sensor without use of high drive frequency.

The featured electronic imaging system of the present invention and advantages thereof compared with the prior art are summarized as follows:

(1) An electronic imaging system comprising:
  a solid-state image sensor having a two dimensional array of pixels capable of converting light incident thereon to electric signal, the pixels being arranged in a plurality of horizontal lines, the lines being arranged vertically one under another; and
  control means for selectively controlling a mode for sequential scan reading the whole pixels of the solid-state image sensor for still picture recording, and a mode for reading out pixel signals of k (k being a positive integer) vertically continuous lines of the solid-state image sensor for still picture recording or dynamic image processing.

In the prior art, when sequential scan driving an inter-line solid-state image sensor of, for instance, a 1,000,000 pixel class at 20 Mhz or below, the frame rate was 10 to 15 frames per second, making it impossible a process of control requiring dynamic image data, for instance.

According to the invention as set forth in (1) above, it is possible to improve the frame rate to (whole line number)/k times compared to the case of sequential scan reading the whole lines. It is thus possible to provide an electronic imaging system, which can provide a solid-state image sensor output at an increased frame rate without use of any high drive frequency.

(2) The electronic imaging system as set in (1), in which the control means controls a mode of reading a plurality of k line blocks each of k lines in the whole lines for still picture recording or dynamic image processing.

According to the invention as set forth in (2), in addition to obtaining the same effects as those according to the invention as set forth in (1), it is possible to improve the frame rate to (whole line number)/(k×(number of k line blocks)) times compared to the case of sequential scan reading the whole lines.

(3) The electronic imaging system as set forth in (1) or (2), in which the control means reads out pixel signals concerning k lines and controls dynamic image processing of the read-out signals or using the dynamic image processed signal as AF, AE or AWB control data.

In the prior art, since the obtainable frame rate was, for instance, 10 to 15 frames per second, the AF, AE or AWB control was time-consuming, making it impossible to be ready for still picture photography in a short period of time.

According to the invention as set forth in (3), in addition to obtaining the same effects as those obtainable according to the invention as set forth in (1) or (2), the frame rate for the AF, AE or AWB control was improved to (whole line number)/k or (whole line number)/(k×(number of k line blocks)) times, making it possible to be ready for still picture photography in a shorter period of time. In addition, it is possible to fast obtain pixel signals concerning an area necessary for the AF, AE or AWB control.

(4) The electronic imaging system as set forth in (1) or (2), in which the control means reads out pixel signals concerning k lines and controls dynamic image processing of the read-out signals or using the dynamic processed signal as AF, AE or AWB control data, the AF, AE and AWB control data being calculated sequentially each in each frame.

In the prior art, due to low frame rate it was necessary to make the AF, AE and AWB controls in parallel processes, thus leading to circuit scale increase.

According to the invention as set forth in (4), in addition to obtaining the same effects as those obtainable according to the invention as set fourth in (1) or (2), it is possible to calculate AF, AE and AWB control data sequentially, thus reducing adverse effects of flicker which may be generated in the individual data.

(5) An electronic imaging system comprising:
  a solid-state image sensor having a two dimensional array of pixels capable of converting light incident thereon to electric signal, the pixels being arranged in a plurality of horizontal lines, the lines being arranged vertically one under another; and
  control, means for selectively controlling a mode for sequential scan reading out pixel signals concerning the whole pixels of the solid-state image sensor for still picture recording, and a mode for reading out pixel signals of n (n≧1, n being an integer) lines among every m (m≧3, m being an integer) vertically continuous lines in k (k≧6, k being an integer) continuous lines of the solid-state image sensor for still picture recording or dynamic image processing.

In the prior art, when sequential scan driving an inter-Line solid-state image sensor of, for instance, a 1,000,000 pixel class at 20 Hz, for instance, the frame rate was 10 to 15 frames per second, making it impossible a process of control requiring dynamic image data, for instance.

According to the invention as set forth in (5), the frame rate can be improved to (m/n)×(whole line number)/k times compared to the case of sequential scan reading the whole lines. In addition, by thinning down lines, it is possible to obtain pixel signals concerning a broader area without frame rate sacrifice. It is thus possible to provide an electronic imaging system, which can provide a solid-state image sensor output at an increased frame rate without use of any high drive frequency.

(6) An electronic imaging system comprising:
  a solid-state image sensor having a two dimensional array of pixels capable of converting light incident thereon to electric signal, the pixels being arranged in a plurality of horizontal lines, the lines being arranged vertically one under another; and
  control, means for selectively controlling a mode for sequential scan reading out pixel signals concerning the whole pixels of the solid-state image sensor for still picture recording, a mode for reading out pixel signals of n (n≧1, n being an integer) lines among every m (m≧3, m being an integer) vertically continuous lines in k (k≧6, k being an integer) continuous lines of the solid-state image sensor for still picture recording or dynamic image processing, and a mode for reading out pixel signals of n (n≧1, n being an integer) lines among every m (m≧3, m being an integer) vertically continuous lines of the solid-state image sensor for still picture recording or dynamic image processing.

According to the invention as set forth in (6), thinned-down data of the whole photoelectric surface area at a frame rate improved to m/n times and data of some vertically continuous lines at a frame rate improved to (m/n)×(whole line number)/k times, can be obtained as solid-state image sensor outputs. It is thus possible to provide an electronic imaging system, which can provide a solid-state image sensor output at an increased frame rate without use of any high drive frequency.

(7) The electronic imaging system as set in (6), in which the control means controls a mode of reading a plurality of k line blocks each of k lines in the whole lines for still picture recording or dynamic image processing.

According to the invention as set forth in (7), in addition to obtaining the same effects as those obtainable according to the invention as set forth in (7), the frame rate can be improved to (m/n)×(whole line number)/(k×(number of k line blocks)).

(8) The electronic imaging system as set forth in (5), (6) or (7), in which pixel data obtained by reading out pixel signals of n lines among every m vertically continuous lines for still picture recording or dynamic image processing, is such that its color signal is line sequential data.

In a single plate camera, the solid-state image sensor filter is advantageously color line sequential from the standpoint of the resolution. With prior art means of purely thinning down one line among two lines, line sequential data cannot be obtained.

According to the invention as set forth in (8), in addition to obtaining the same effects as those obtainable according to the invention as set forth in (5), (6) or (7), line sequential color signal is obtainable, so that it is possible to obtain necessary color signals without resolution sacrifice.

(9) The electronic imaging system as set forth in (5), (6) or (7), in which the solid-state image sensor has line sequential color filters.

According to the invention as set forth in (9), in addition to obtaining the same effects as those obtainable according to the invention as set forth in (6) or (7), it is possible to obtain line sequential color signal with either sequential scan read mode output or every m line read mode output.

(10) The electronic imaging system as set forth in (5), (6) or (7), in which m=2α+1 (α being a positive integer) and n=1.

With prior art means of purely thinning down one line among two lines or the like, line sequential data cannot be obtained.

According to the invention as set forth in (10), in addition to obtaining the same effects as those obtainable according to the invention as set forth in (5), (6) or (7), it is possible, in the case of using a line sequential filter, to obtain line sequential image signal directly therefrom.

(11) The electronic imaging system as set forth in (5), (6) or (7), in which signal having been dynamic image processed in either one of the modes noted above can be used for AF, AE or AWB control.

In the prior art, since the obtainable frame rate was, for instance, 10 to 15 frames per second, the AF, AE or AWB control was time-consuming, making it impossible to be ready for still picture photography in a short period of time.

According to the invention as set forth in (11), in addition to obtaining the same effects as those obtainable according to the invention as set forth in (5), (6) and (7), the frame rate for the AF, AE or AWB control was improved to (m/n)×(whole line number)/k or (m/n)×(whole line number)/(k×(number of k line blocks)), making it possible to be ready for still picture photography in a short period of time. In addition, it is possible to fast obtain pixel signals concerning an area necessary for the AF, AE or AWB control.

(12) The electronic imaging system according to (5), (6) or (7), in which dynamic image processed signal obtained in either of the above modes is used as AF, AE or AWB control data, the AF, AE or AWB control data being calculated sequentially each in each frame.

In the prior art, due to low frame rate it was necessary to make the AF, AE and AWB controls in parallel processes, thus leading to circuit scale increase.

According to the invention as set forth in (12), in addition to obtaining the same effects as those obtainable according to the invention as set forth in (5), (6) or (7), it is possible to calculate AF, AE and AWB control data sequentially, thus reducing adverse effects of flicker which may be generated in the individual data.

(13) The electronic imaging system as set forth in (6), in which the control means selects a mode for reading out pixel signals concerning n lines among m vertical continuous lines when obtaining dynamic image processed signal to be supplied to a display provided in it or an external display provided outside it or to be used as AE or AF control data, and selects a mode of reading out pixel signals concerning n lines among m vertically continuous lines in k continuous lines when obtaining dynamic image processed signal to be used as AF or AE control data.

Pixel signals read out from pixels in only some lines of the solid-state image sensor, were not suited for being directly displayed on the whole display screen in the prior art.

According to the invention as set forth in (13), in addition to obtaining the same effects as those obtainable according to the invention as set forth in (6), a mode to be used for display is provided separately from the mode of processing data at the frame rate improved to (m/n)×(whole line number)/k or (m/n)×(Whole line number)/(k×(number of k line blocks)) times. It is thus possible to display image concerning the whole display screen by using data obtained by thinning down lines constituting the whole photoelectric surface.

(14) An electronic imaging system comprising:
a solid-state image sensor having a two-dimensional array of pixels capable of converting light incident thereon to electric signal, the pixels being arranged in a plurality of horizontal lines, the lines being arranged vertically one under another; and
control means for selectively controlling a mode for sequential scan reading out pixel signals concerning the whole pixels of the solid-state image sensor for still picture recording, and a mode for reading out pixel signal sums each of n (n≧2, n being an integer) lines among m (m≧3, m being an integer) in k (k≧6, k being an integer) continuous lines of the solid-state image sensor for still picture recording or dynamic image processing.

In the prior art, when sequential scan driving an inter-line solid-state image sensor of, for instance, a 1,000,000 pixel class at 20 MHz or below, the frame rate was 10 to 15 frames per second, making it impossible a process of control requiring dynamic image data, for instance.

According to the invention as set forth in (14), the frame rate can be improved to m×(whole line number)/k times compared to the case of sequential scan reading the whole lines. In addition, it is possible to obtain data of an increased dynamic range as solid-state image sensor output by adding together signals of n lines. It is thus possible to provide an electronic imaging system, which can provide a solid-state image sensor output at an increased frame rate without use of any high drive frequency.

(15) An electronic imaging system comprising:
a solid-state image sensor having a two-dimensional array of pixels capable of converting light incident thereon to electric signal, the pixels being arranged in a plurality of horizontal lines, the lines being arranged vertically one under another; and
control means for selectively controlling a mode for sequential scan reading out pixel signals concerning the whole pixels of the solid-state image sensor for still picture recording, a mode for reading out pixel signal sums each of n (n≧2, n being an integer) lines among m (m≧3, m being an integer) lines of the solid-state image sensor for still picture recording or dynamic image processing, and a mode for reading out pixel signal sums of n lines among m lines in k (k≧6, k being an integer) continuous lines of the solid-state image sensor for still picture recording or dynamic image processing.

According to the invention as set forth in (15), thinned-down data of the whole photoelectric surface area at a frame rate improved to m times and data of some continuous lines at a frame rate improved to m×(whole line number)/k times, can be obtained as solid-state image sensor outputs. It is thus possible to provide an electronic imaging system, which can provide a solid-state image sensor output at an increased frame rate without use of any high drive frequency.

(16) The electronic imaging system as set in (14) or (15), in which the control means controls a mode of reading a plurality of k line blocks each of k lines in the whole lines for still picture recording or dynamic image processing.

According to the present invention as set forth in (16), in addition to obtaining the same effects as those according to the present invention as set forth in (14) or (15), it is possible to improve the frame rate to (whole line number)/(k×(number of k line blocks)) times compared to the case of sequential scan reading the whole lines.

(17) The electronic imaging system as set forth in (14), (15) or (16), in which image data obtained by reading out pixel signal sums each of n lines among m vertically continuous lines for still picture recording or dynamic image processing, is such that its color signal is line sequential data.

Where a line sequential filter is used as color filters of the solid-state image sensor, pure addition of signals results in mixing of color signals.

According to the invention as set forth in (17), in addition to obtaining the same effects as those obtainable according to the invention as set forth in (14), (15) or (16), line sequential color signal is obtainable, so that it is possible to obtain necessary color signals without resolution sacrifice.

(18) The electronic imaging system as set forth in (14), (15) or (16), in which the solid-state image sensor has a line sequential filter as color filter.

According to the invention as set forth in (18), in addition to obtaining the same effects as those obtainable according to the invention as set forth in (14), (15) and (16), it is possible to obtain line sequential color signal with either sequential scan read mode output or every m line read mode output.

(19) The electronic imaging system as set forth in (14), (15) or (16), in which the n lines for addition are constituted by the same color filter.

According to the invention as set forth in (19), in addition to obtaining the same effects as those obtainable according to the invention as set forth in (14), (15) and (16), no color signals are mixed together, and it is possible to reduce adverse effects of moire or the like.

(20) The electronic imaging system as set forth in (14), (15) or (16), in which the addition n lines are constituted by the same color filter, and different n line addition filter are provided for every m lines.

According to the invention as set forth in (20), in addition to obtaining the same effects as those obtainable according to the invention as set forth in (14), (15) and (16), it is possible to obtain line sequential color signal for every m lines.

(21) The electronic imaging system as set forth in (19), in which m=2α+1 (α being a positive integer).

According to the invention as set forth in (21), in addition to obtaining the same effects as those obtainable according to the invention as set forth in (19), signals of n lines among every m lines, i.e., every odd number of lines. This means that when obtaining line sequential color signal for every m lines, data of the closest line to an adjacent m line block is used, so that it is possible to suppress false color generation in a simultaneous process.

(22) The electronic imaging system as set forth in (14), (15) or (16), in which dynamic image processed signal obtained in either of the above modes is used for AF, AE or AWB control data.

In the prior art, since the obtainable frame rate was, for instance, 10 to 15 frames per second, the AF, AE or AWB control was time-consuming, making it impossible to be ready for still picture photography in a short period of time.

According to the invention as set forth in (22), in addition to obtaining the same effects as those obtainable according to the invention as set forth in (14), (15) or (16), the frame rate for AF control is imposed to m×(whole line number)/k or m×(whole line number)/(k×(number of k line blocks)), thus permitting faster operation. In addition, only image signal concerning an area necessary for the AF control is fast obtainable.

(23) The electronic imaging system as set forth in (14), (15) or (16), in which dynamic image processed signal obtained in either of the above modes is used as AF, AE or AWB control data, AF, AE and AWB control data being calculated sequentially each in each frame.

In the prior art, due to low frame rate it was necessary to make the AF, AE and AWB controls in parallel processes, thus leading to circuit scale increase.

According to the invention as set forth in (23), in addition to obtaining the same effects as those obtainable according to the invention as set forth in (14), (15) or (16), it is possible to calculate AF, AE and AWB control data sequentially, thus reducing adverse effects of flicker which may be generated in the individual data.

(24) The electronic imaging system as set forth in (15), in which the control means selects a mode of reading out pixel signal sums each of n lines among m vertically continuous lines when obtaining dynamic image processed signal to be displayed on a display provided in it, to be supplied to an external display provided outside it or to be used as AE or AWB control data, and selects a mode of reading out pixel signals of n lines among every m vertically continuous lines in k continuous lines when obtaining dynamic image processed signal to be used as AF or AE control data.

Pixel signals read out from pixels in only some lines of the solid-state image sensor were not suited for being directly displayed on the whole display screen in the prior art.

According to the invention as set forth in (24), in addition to obtaining the same effects as those obtainable according to the invention as set forth in (15), a mode to be used for display is provided separately from the mode of processing data at the frame rate improved to m×(whole line number)/k or m×(whole line number)/(k×(number of k line blocks)) times. It is thus possible to display image concerning the whole display screen by using data obtained by thinning down lines constituting the whole photoelectric surface.

(25) An electronic imaging system comprising:
 a solid-state image sensor having a two-dimensional array of pixels capable of converting light incident thereon to electric signal, the pixels being arranged in a plurality of horizontal rows or lines, the lines being arranged vertically one under another; and
 control means for selectively controlling a mode for sequential scan reading out pixel signals concerning the whole pixels of the solid-state image sensor for still picture recording, and a mode for reading out pixel signal sums each of every q (q≧3, q being an integer) vertically continuous lines in k (k≧6, k being an integer) lines of the solid-state image sensor for still picture recording or dynamic image processing.

In the prior art, when sequential scan driving an inter-line solid-state image sensor of, for instance, a 1,000,000 pixel class at 20 MHz or below, the frame rate was 10 to 15 frames per second, making it impossible a process of control requiring dynamic image data, for instance.

According to the invention as set forth in (25), the frame rate can be improved to q×(whole line number)/k times compared to the case of sequential scan reading the whole lines. In addition, it is possible to obtain data of an increased dynamic range as solid-state image sensor output by adding together signals of q lines. It is thus possible to provide an electronic imaging system, which can provide a solid-state image sensor output at an increased frame rate without use of any high drive frequency.

(26) An electronic imaging system comprising:
a solid-state image sensor having a two-dimensional array of pixels capable of converting light incident thereon to electric signal, the pixels being arranged in a plurality of horizontal lines, the lines being arranged vertically one under another; and
control means for selectively controlling a mode for sequential scan reading out pixel signals concerning the whole pixels of the solid-state image sensor for still picture recording, a mode for reading out pixel signals of n (n≧1, n being an integer) lines among m (m≧3, m being an integer) vertically continuous lines of the solid-state image sensor for still picture recording or dynamic image processing, and a mode for reading out pixel signal sums each of q (q≧3, q being an integer) vertically continuous lines in k (k≧6, k being an integer) lines of the solid-state image sensor for still picture recording or dynamic image processing.

According to the invention as set forth in (26), thinned-down data of the whole photoelectric surface area at a frame rate improved m/n times and data of a certain vertically continuous line area at a frame rate improved to q×1(whole line number)/k times, can be obtained as solid-state image sensor outputs. In addition, data of addition and data of non-addition of different filter color data can be obtained. It is thus possible to provide a solid-state imaging system, which can provide a solid-state image sensor output at an increased frame rate without use of any high drive frequency.

(27) An electronic imaging system comprising:
a solid-state image sensor having a two-dimensional array of pixels capable of converting light incident thereon to electric signal, the pixels being arranged in a plurality of horizontal lines, the lines being arranged vertically one under another; and
control means for selectively controlling a mode for sequential scan reading out pixel signals concerning the whole pixels of the solid-state image sensor for still picture recording, a mode for reading out pixel signal sums each of n (n≧2, n being an integer) lines among m (m≧3, m being an integer) vertically continuous lines of the solid-state image sensor for still picture recording or dynamic image processing, and a mode for reading out pixel signal sums each of q (q≧1, q being an integer) lines in k (k≧6, k being an integer) continuous lines of the solid-state image sensor for still picture recording or dynamic image processing.

According to the invention as set forth in (27), thinned-down data of the whole photoelectric surface areas at a frame rate improved to m times and data of a certain vertically continuous line area at a frame rate improved to q×(whole line number)/k, can be obtained as solid-state image sensor outputs. In addition, data of addition and data of non-addition of different filter color data can be obtained as solid-state image sensor outputs. It is thus possible to provide an electronic imaging system, which can provide a solid-state image sensor output at an increased frame rate without use of any high drive frequency.

(28) The electronic imaging system as set forth in (25), (26) or (27), in which the control means has a mode of reading a plurality of k line blocks for still picture recording or dynamic image processing.

According to the invention as set forth in (28), in addition to obtaining the same effects as those obtainable according to the invention as set forth in (25), (26) and (27), the frame rate can be improved to q×(whole line number)/(k×(number of k line blocks)) times compared to the case of sequential scan reading the whole lines.

(29) The electronic imaging system as set forth in (26), (27) or (28), in which the solid-state image sensor has color filter constituted by line sequential filter.

In the prior art, where the solid-state image sensor has line sequential filters as color filters, pure addition of signals may result in mixing thereof.

According to the invention as set forth in (29), in addition to obtaining the same effects as those obtainable according to the invention as set forth in (26), (27) or (28), it is possible to provide different combinations of addition filters for different modes.

(30) The electronic imaging system as set forth in (27), in which the n addition lines are constituted by the same color filter.

According to the invention as set forth in (30), in addition to providing the same effects as those obtainable according to the invention as set forth in (27), it is possible to reduce adverse effects of moire or the like without possibility of mixing of color signals.

(31) The electronic imaging system as set forth in (27), in which the n addition lines are constituted by the same color filter, and different n line addition filters are provided for every m lines.

In the prior art, the same problems as described in connection with (29) were posed.

According to the invention as set forth in (31), in addition to obtaining the same effects as those obtainable according to the invention as set forth in (27), it is possible to obtain line sequential color signal for every m lines.

(32) The electronic imaging system as set forth in (26), in which m=2α+1 (α being a positive integer) and n=1.

According to the invention as set forth in (32), in addition to obtaining the same effects as those obtainable according to the invention as set forth in (26), where the color filters are line sequential filters, it is possible to obtain line sequential image signal by reading one line for every odd lines as m lines.

(33) The electronic imaging system as set forth in (30), in which m=2α+1 (α being a positive integer).

According to the invention as set forth in (33), in addition to obtaining the same effects as those obtainable according to the invention as set forth in (30), line sequential color signal is obtained for every m lines by adding the data of n lines for odd m lines on the basis of the data of lines closest to adjacent m line blocks. It is thus possible to suppress false color generation in a simultaneous process.

(34) The electronic imaging system as set forth in (25), (26), (27) and (28), in which dynamic image processed signal obtained in either of the above modes is used as AF, AE or AWB control data.

In the prior art, since the obtainable frame rate was, for instance, 10 to 15 frames per second, the AF, AE or AWB control was time-consuming, making it impossible to be ready for still picture photograph in a short period of time.

According to the invention as set forth in (34), in addition to obtaining the same effects as those obtainable according to the invention as set forth in (25), (26), (27) or (28), the frame rate for the AF, AE or AWB control was improved to q×(whole line number)/k or q×(whole line number)/(k×(number of k line blocks)) times. It is thus possible to obtain still faster operation. In addition, it is possible to fast obtain pixel signals concerning an area necessary for the AP, AE or AWB control.

(35) The electronic imaging system as set forth in (25), (26), (27) or (28), in which dynamic image processed signal obtained in either of the above modes is used as AF, AE or AWB control data, the AF, AE and AWB control data being calculated sequentially each in each frame.

In the prior art, due to low frame rate it was necessary to make the AF, AE and AWB controls in parallel processes, thus leading to circuit scale increase.

According to the invention as set forth in (35), in addition to obtaining the same effects as those obtainable according to the invention as set forth in (25), (26), (27) and (28), by sequentially calculating the AF, AE and AWB control data it is possible to alleviate adverse effects of flicker which may be generated in the individual data.

(36) An electronic imaging system as set forth in (26), in which the control means selects a mode for reading out pixel signals of n lines among m vertically continuous lines when obtaining dynamic image processed signal to be displayed on a display provided in it or an external display provided outside it, to be supplied thereto or to be used as AE or AE control data, and selects a mode of reading out pixel signal sums each of q vertically continuous lines in k continuous lines when obtaining dynamic image processed signal to be used as AF or AE control data.

Pixel signals read out from pixels of only some lines of the solid-state image sensor were not suited for display on the whole display screen in the prior art.

According to the invention as set forth in (36), in addition to obtaining the same effects as those obtainable according to the invention as set forth in (26), with the mode used for display, which is provided separately from the mode of processing data at frame rate improved to q×(whole line number)/k or q×(whole line number)/(k×(number of k line blocks)) times, it is possible to display image on the whole screen by using thinned-down data obtained form the whole photoelectric surface.

(37) The electronic imaging system as set forth in (27), in which the control means selects a mode pixel signal sums each of n lines among m vertically continuous lines when obtaining dynamic image processed signal to be displayed on a display provide in it, to be supplied to an external display provided outside it or to be used as AE or AWB data, and selects a mode of reading out pixel signal sums each of q vertically continuous lines when obtaining dynamic image processed signal to be used as AF or AE control data.

According to the invention as set forth in (37), in addition to obtaining the same effects as those obtainable according to the invention as set forth in (27), with the mode used for display, which is provided separately from the mode of processing data at a frame rate improved to q×(whole line number)/k or q×(whole line number)/(k×(number of k line blocks)) times, it is possible to display image concerning the whole screen by using thinned-down data obtained from the whole photoelectric surface.

Other objects and features will be clarified from the following description with reference to attached drawings.

BRIEF DESCRIPTION OF THE DRAWINGS

FIG. 24 is a time chart illustrating CCD output data and liquid crystal display data obtainable by prior art CCD drive means;

DETAILED DESCRIPTION OF THE PREFERRED EMBODIMENTS

Figure 1:
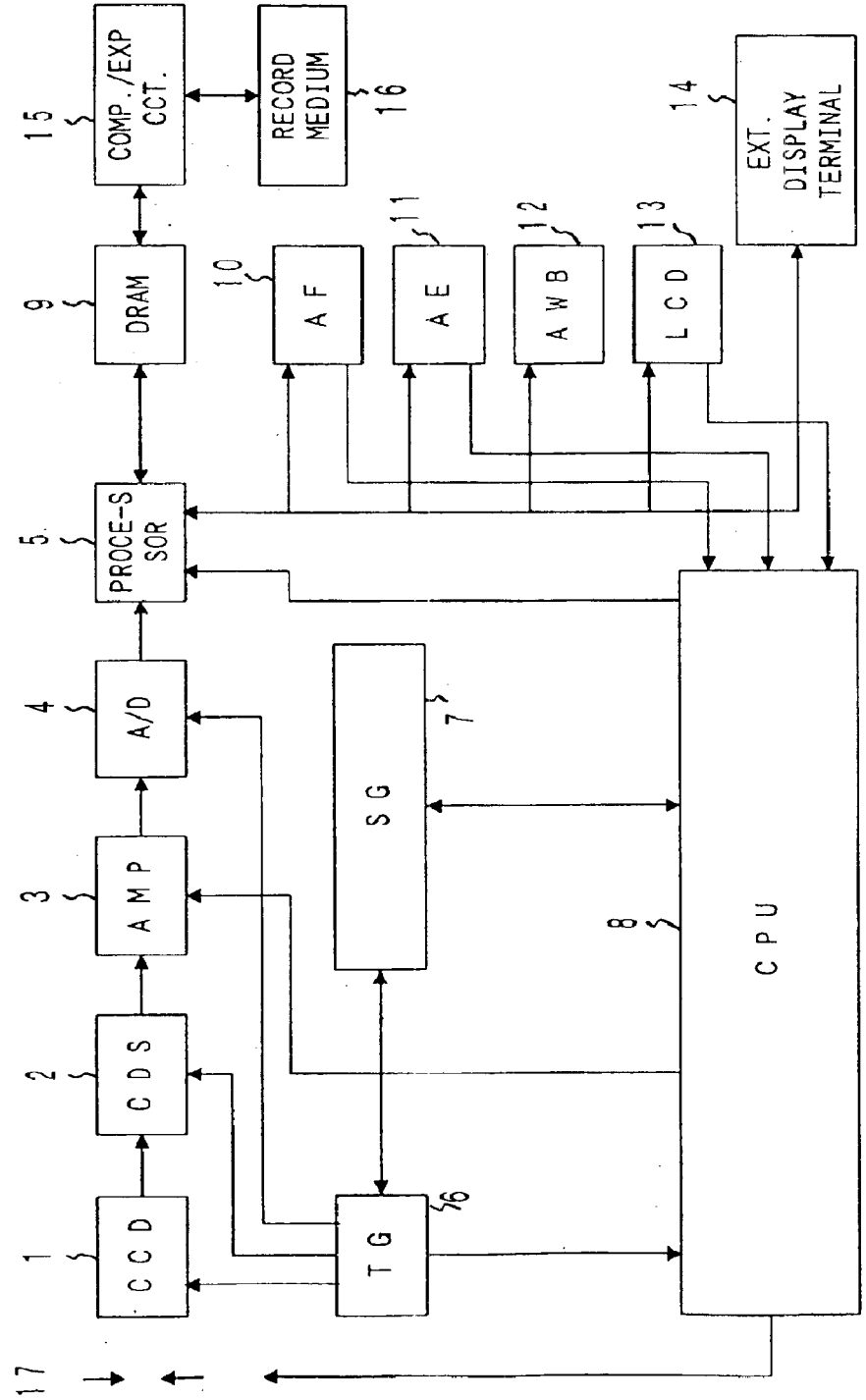
FIG. 1 is a block diagram showing the construction of a first embodiment of the electronic imaging system according to the present invention.
Figure 2:
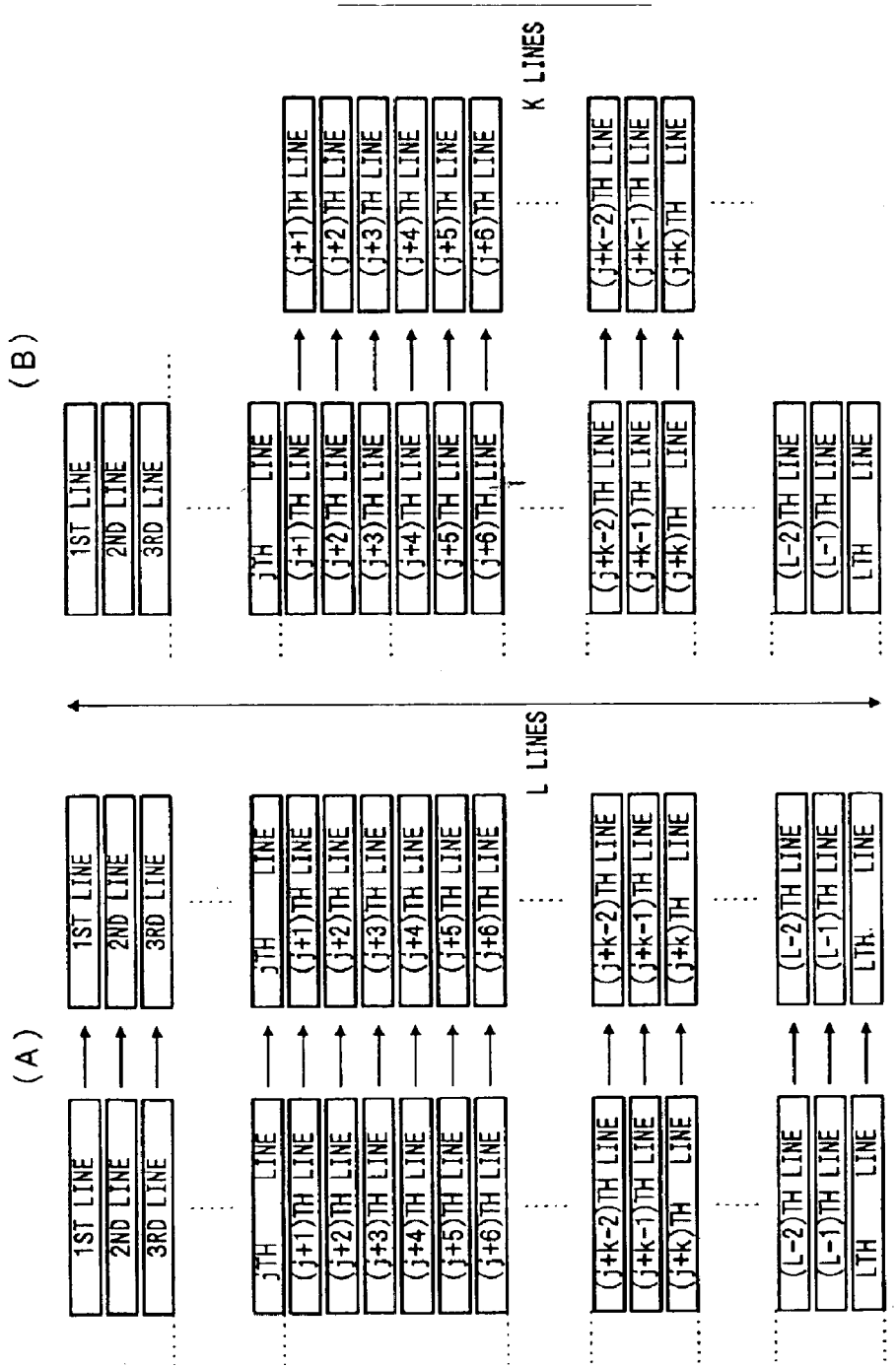
FIGS. 2(A) and 2(B) are views illustrating methods of reading out image data from lines of a CCD in the first embodiment of the electronic imaging system.

FIGS. 1 to 6 are views concerning a first embodiment of the electronic imaging system according to the present invention. FIG. 1 is a block diagram showing the electronic imaging system.

The illustrated electronic imaging system has a primary purpose of taking and recording still pictures. As shown in FIG. 1, the system comprises a CCD 1 which is a two-dimensional array solid-state image sensor for converting subject image incident through lenses and a stop 17 to electric signal, a correlative double-sampling (CDS) circuit 2 for removing reset noise and the like from the output of the CCD 1, a gain control amplifier (AMP) 3 for controlling the gain of the output of the correlative double-sampling circuit 2, an analog-to-digital (A/D) converter 4 for converting output signal of the gain control amplifier 3 to a digital signal, a processor 5 for executing various processes on the digital signal as video signal, a timing generator (TG) 6 for providing a transfer pulse output for driving the CCD 1, a sample/hold pulse output for the correlative double-sampling circuit 2 and a timing pulse output for the A/D conversion in the A/D converter 4, a signal generator (SG) 7 for generating a signal for synchronization of the timing generator 6 with a CPU 8, the CPU 8 which is a microcomputer, for instance, for executing various controls, including timing control, of the whole electronic imaging system, a DRAM 9 for storing pixel data of the CCD 1 provided from the processor 5, an auto focus (AF) control circuit 10 for executing calculations for auto focusing by the lenses and stop 17 noted above, an auto exposure (AE) control circuit 11 for executing photometric control of subject image focused on the CCD 1, an auto white balance (AWB) circuit 12 for executing automatic white balance control, a liquid crystal display 13 provided in the electronic imaging system, an external display terminal 14 for outputting signal therefrom to an external display, such as a monitor provided outside the electronic imaging system, a compression/expansion circuit 15 for compressing one frame of pixel data stored in the DRAM 8 to record the data in a reduced data quantity in a recording medium 16 and also expanding compressed data read out from the recording medium 16, and the recording medium 16 for recording still picture data therein.

Such electronic imaging system operates to record the image as follows.

Image signal which is provided from the CCD 1 and coupled through the CDS circuit 2, the AMP 3, the A/D converter 4 and the processor 5, is displayed on, for instance, the liquid crystal display 13. The photographer determines the subject composition and so forth by watching the liquid crystal display 13, and then depresses a photograph button (not shown).

As a result, the output of the processor 5 is coupled through the DRAM 9 to the compression/expansion circuit 15 for compression and then recorded in the recording medium 16.

The electronic imaging system reproduces the recorded image as follows.

Compressed data stored in the recording medium 16 is read out for expansion in the compression/expansion circuit 15, and the expanded data is written in the DRAM 9.

The data thus written is read out and coupled through the processor 5 to the liquid crystal display 13 or through the external display terminal 14 to the external display for the still picture reproduction.

In the above construction, image data is obtained from the CCD 1 by driving the same in manners, which will now be described. FIGS. 2(A) and 2(B) are views illustrating methods of reading out the image data from CCD lines.

Referring to FIGS. 2(A) and 2(B), horizontal pixel rows of the CCD 1 which is a two-dimensional array solid-state image sensor, are referred to as lines. All the lines of the CCD 1 from 1-st to L-th are arrayed in a column.

FIG. 2(A) illustrates a mode, in which pixel signals are read out from all the pixels of the CCD 1 by sequentially scanning lines thereof from the 1-st to the L-th line, and used for recording a still picture. Specifically, in this mode data concerning all the CCD pixels is provided by sequentially scanning the whole CCD face area as shown enclosed in a rectangular frame in FIG. 4, so that a high resolution image can be obtained as still picture.

Figure 4:
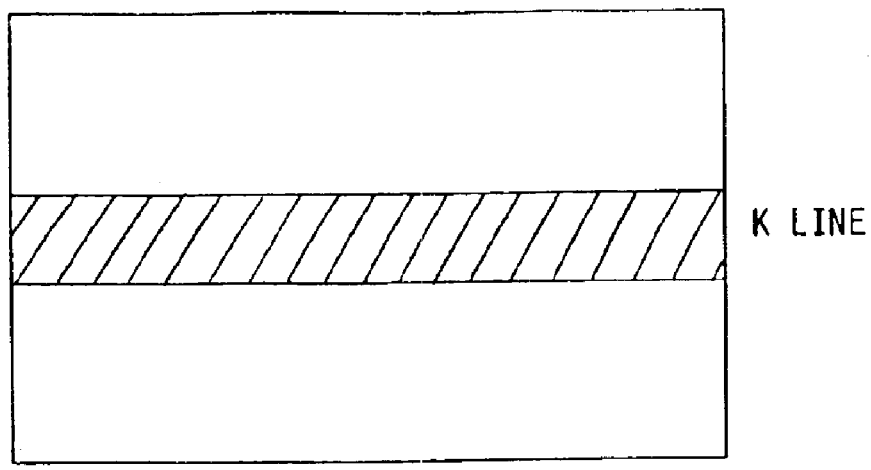
FIG. 4 is a view showing a k vertically continuous line block which is read out in the first embodiment of the electronic imaging system.

FIG. 2(B) illustrates a mode, in which pixel signals are read out from a k (k being a positive integer) vertically continuous line block from (j+1)-th to (j+k)-th line (j being an integer greater than 0) of the CCD 1 as shown shaded in FIG. 4, and subjected to dynamic image processing. It is possible to use the output obtained in this mode for recording a still picture.

Reading only the k continuous line block can improve the frame rate to L/k times that in the case of reading all the L lines. This is effective for dynamic image processing, and permits high frame rate dynamic image data to be obtained.

The k continuous line block is suitably selected to be, for instance, at the center of the photoelectric surface area of the CCD 1. This is so because the image data obtained in this mode is used for such processes as auto focus (AF) control, auto exposure (AE) control and auto white balance (AWB) control, in which processes emphasis is laid on the CCD photoelectric surface area center in many cases.

Figure 3:
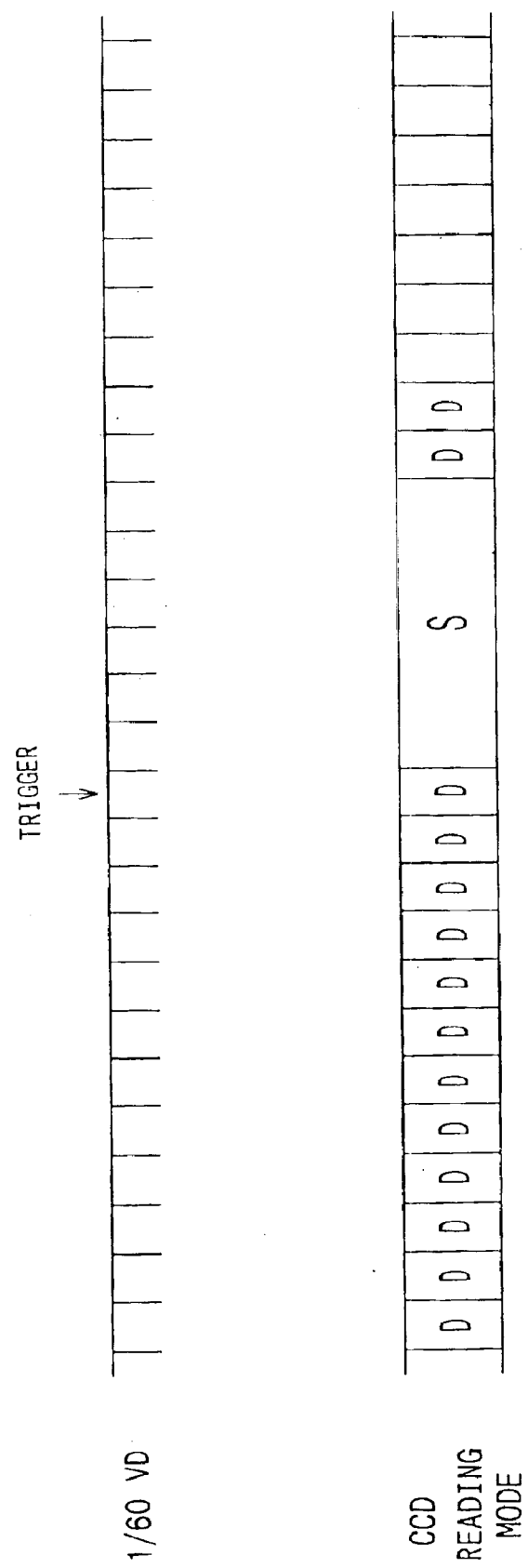
FIG. 3 is a time chart illustrating a CCD read mode in the first embodiment of the electronic imaging apparatus.

How the modes as shown in FIGS. 2(A) and 2(B) are executed, will now be described with reference to FIG. 3. FIG. 3 is a time chart illustrating a CCD read mode in the electronic imaging system. In FIG. 3, D and S represent the dynamic image processing and still image processing, respectively.

Referring to the Figure, labeled 1/60 VD is a vertical sync signal having a cycle period of 1/60 second. That is, in this example, like the prior art example described before in connection with FIG. 24, the cycle period of the vertical sync signal is set to 1/60 second.

Shown under the 1/60 VD is a CCD read mode, in which signals are read out from the CCD 1 in FIG. 3.

Figure 6:
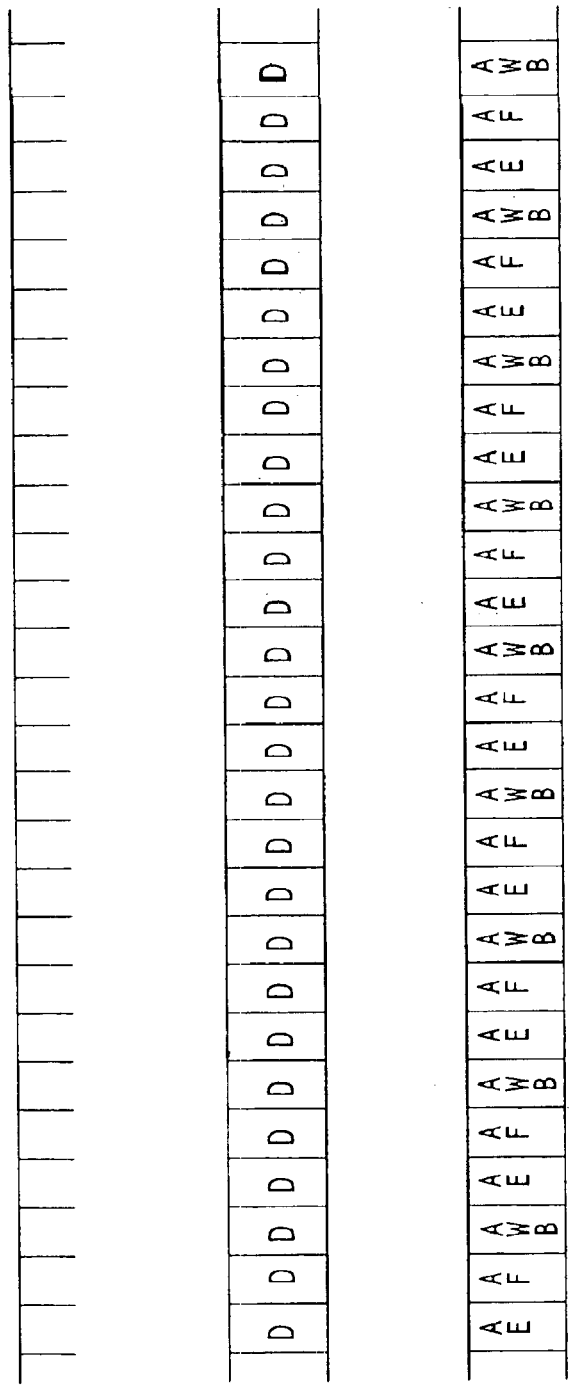
FIG. 6 is a time chart illustrating a CCD read mode and control data in the first embodiment of the electronic imaging system.

As shown, in the case other than the case of obtaining high quality still picture data, a k continuous line block is read out in the mode as shown in FIG. 2(B) to improve the frame rate. By so doing, synchronization to the vertical sync signal VD can be obtained to permit dynamic image processing. The image data obtained in this way is used repeatedly frame by frame for processes of calculating control data for AE, AF and AWB as shown in FIG. 6.

Where different processes are executed each in each frame in a recurring fashion as above, the control data may be stored. The individual control data may be accumulated in the same accumulation system in compliance with the contents of the respective processes.

When a trigger signal is issued as a result of depression of a photographing button (not shown) during the above process, a still picture can be taken right after the frame, in which the trigger signal is inputted. This is so because of the presence of adequately controlled exposure and focus states obtained in the previous mode of dynamic image processing.

The still picture is taken by sequential scan read of the CCD 1 from the 1-st to the L-th line thereof in the mode as shown in FIG. 2(A). Where this full or whole line scan takes, for instance, 1/60 second, a time corresponding to six frames is necessary to provide the whole still picture data so long as the vertical sync signal having a cycle period of 1/60 second is used for counting.

When the still picture data has been completely outputted, the dynamic image processing mode is set again, and signal is read out from the k continuous line block and provided for the AE, AF and AWB control processes to be ready for the next still picture photography.

Figure 5:
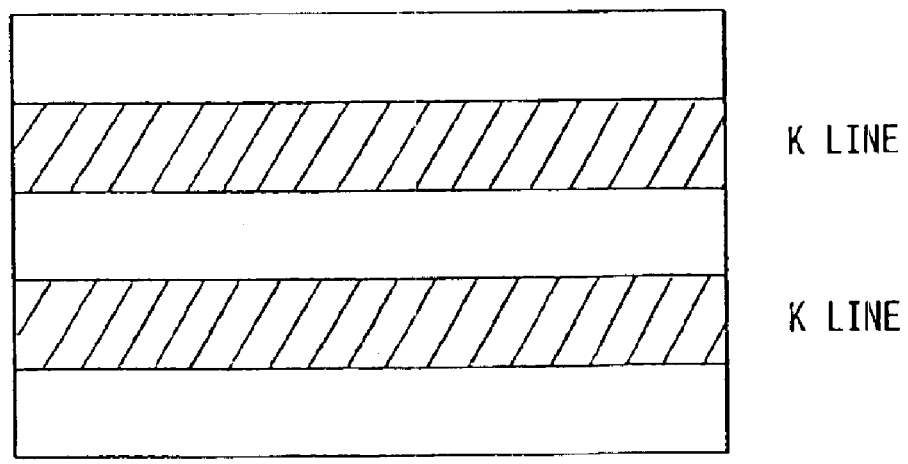
FIG. 5 is a view illustrating a case when a plurality of k vertically continuous line blocks are read out in the first embodiment of the electronic imaging system.

FIG. 5 shows a modification of the example shown in FIG. 4. In this example, data of a plurality of k continuous line blocks is obtained.

In the example shown in FIG. 4, only a single k continuous line block is set, for instance, at the center of the photoelectric surface area of the CCD 1.

In the example shown in FIG. 5, two k continuous line blocks are set, for instance, in portions above and below the center of the photoelectric surface area of the CCD 1.

Setting a plurality of blocks in this way, has an advantage that the scope for taking the AE and AF data therefrom is increased, as well as permitting the AF and AE controls on a commonly termed time division system to improve the accuracy of AF and AE.

Although by reading a plurality of k continuous line blocks results in frame rate sacrifice compared to the case of reading only a single block, it is still possible to obtain a high frame rate compared to the case of reading the whole pixels and permit fast control. In order to avoid frame rate reduction, it is conceivable to reduce the number k of continuous lines compared to the case of reading only a single block.

While in the above example shown in FIG. 5 two read blocks were set, this is by no means limitative; for example, three blocks may be set by adding a central block to improve the accuracy of control.

As shown above, in this embodiment it is possible to provide an electronic imaging system, in which at least one k continuous line block is read when a high frame rate is required for AF, AE and AWB controls, while causing sequential scan read of the whole lines when and only when high resolution still picture data output is necessary, thus ensuring short release time, permitting high quality picture to be obtained and reducing or eliminating the possibility of missing shutter changes.

While FIG. 6 illustrates the AF, AE and AWB controls which are executed as parallel processes, with the improved frame rate the controls may not be executed as parallel processes. With the improved frame rate, it is thus possible to dispense with any memory, and also reduce the circuit scale because it is possible to use a common control circuit.

A further advantage obtainable is that adverse effects of flicker on each data can be reduced by sequential AF, AE and AWB controls each in each frame.

Figure 7:
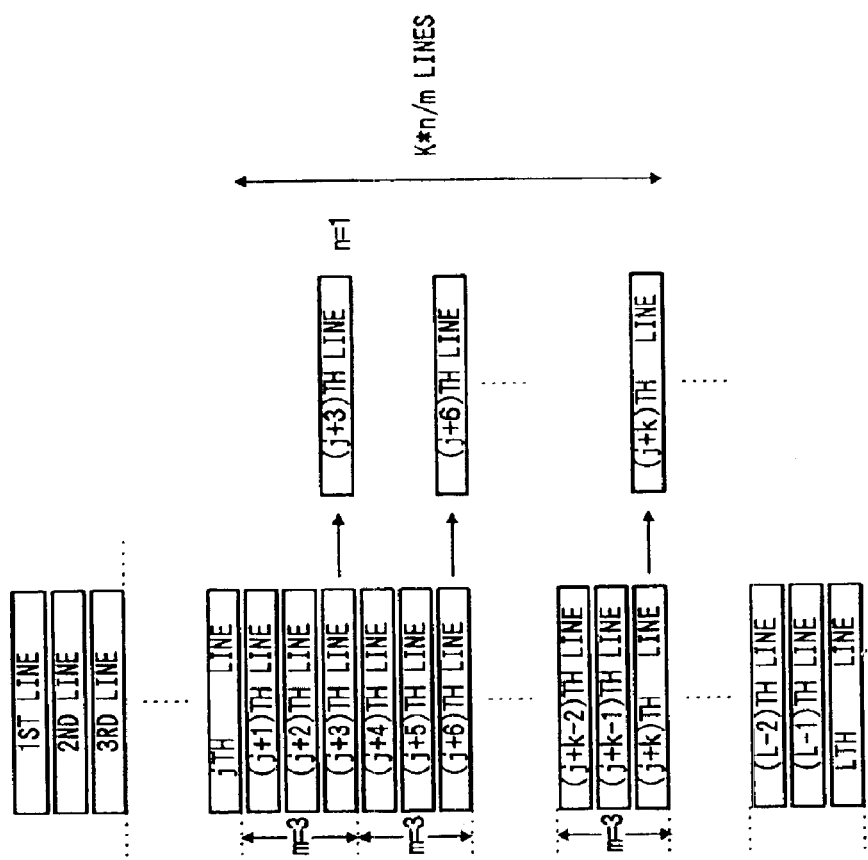
FIG. 7 is a view illustrating a method of reading out image data from CCD lines in a second embodiment of the electronic imaging system according to the present invention.
Figure 8:
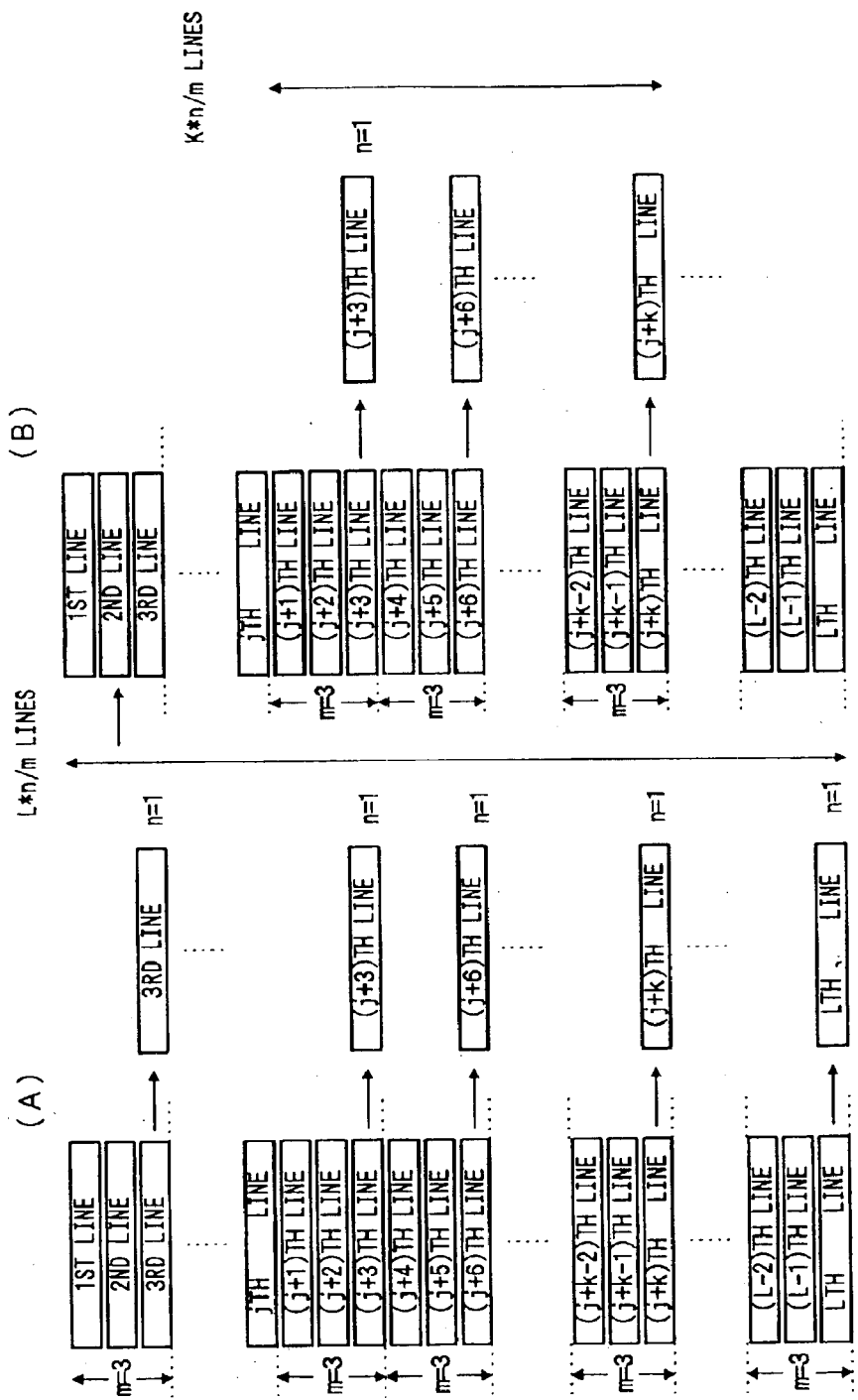
FIGS. 8(A) and 8(B) views illustrating CCD read modes in the second embodiment of the electronic imaging system.

FIGS. 7 to 12 illustrate a second embodiment of the present invention. FIG. 7 is a view illustrating a method of reading out pixel data from CCD lines. In this second embodiment, what are like those in the preceding first embodiment are not described, and only what are different will be described.

The main construction of this second embodiment of the electronic imaging system is the same as shown in FIG. 1.

In this embodiment, as shown in FIG. 7, pixel signals are read out from n (n≧1, n being an integer) lines among m (m≧3, m being an integer) vertically continuous lines in k (k≧6, k being an integer) vertically continuous lines.

More specifically, this embodiment has, in addition to the still picture recording mode for taking a high quality picture by sequential scan read of the whole CCD lines from the 1-st to the L-th line as shown in FIG. 2(A), a mode for reading out pixel signals of n lines among m lines as shown in FIG. 8(A), and a mode for reading out pixel signals of n lines among m lines in k vertically continuous lines as shown in FIG. 8(B), these modes being selectable.

In the examples shown in FIGS. 8(A) and 8(B), m=3, and n=1. Pixel signals of one line are thus obtained in three lines.

Thus, in the mode shown in FIG. 8(A), the frame rate can be increased to three times. In general, L×n/m lines among the whole L lines are read, and this means that the frame rate is increased by m/n times.

In the mode show in FIG. 8(B), k×n/m lines among the whole L lines are read, and this means that the frame rate is increased by (m×L)/(n×k) times.

Data of part of the photoelectric surface area of the CCD 1 as shown in FIG. 2(B) or 8(B) is not suited for dynamic image display on the liquid crystal display 13 or on the external display via the external display terminal 14, and particularly it is inadequate for framing or like purpose. Image data concerning the whole CCD photoelectric surface area is thus necessary. As described before, however, reading the whole CCD lines has the advantage that the frame rate cannot be increased. For this reason, the mode of obtaining image data by thin-down scan read of the whole CD photoelectric surface area as show in FIG. 8(A) is provided.

In this way, it is possible to display whole CCD photoelectric surface area dynamic image of the same framing as that of actually taken still pictures at a high frame rate on the liquid crystal display 13 or the external display via the external display terminal 14 without need of any memory.

In the mode shown in FIG. 8(B), data of k lines is provided by using what is read out by thinning down three lines to one line. Thus, in case when improving the frame rate with the same ratio as in the previous first embodiment, the k line read area is as shown shaded in FIG. 9, which is three times the k line read area as shown shaded in FIG. 4.

A broad CCD photoelectric surface area thus can be used for AF, AE, AWB and so forth controls without frame rate sacrifice.

The mode of thin-down scan reading the whole CCD photoelectric surface area and the mode of thin-down scan read extracting only k lines, can be selectively used for fast process such as the AF control and for liquid crystal display.

Figure 11:
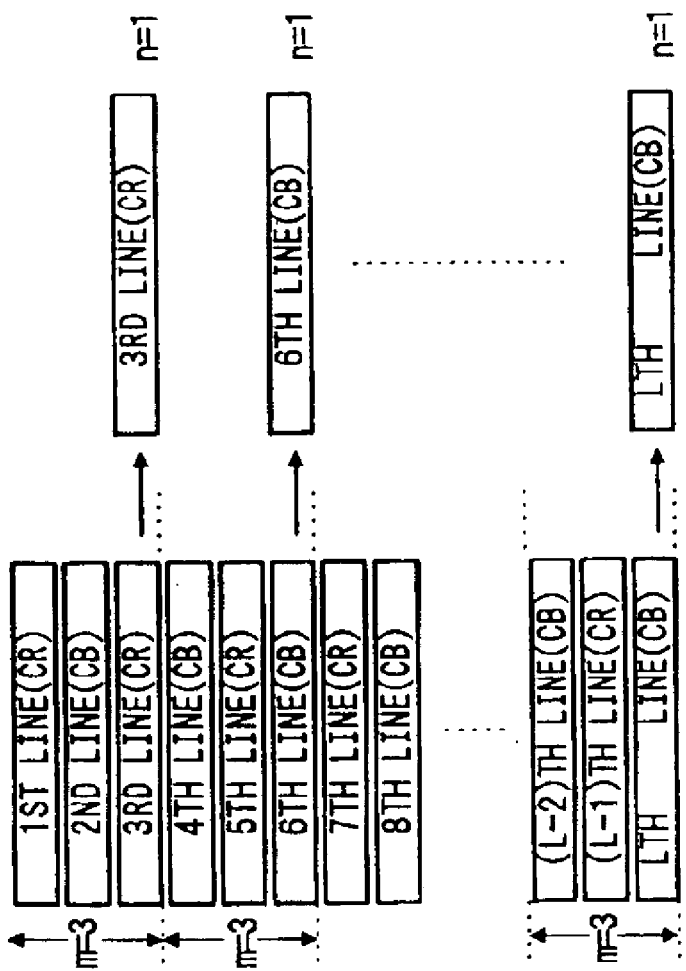
FIG. 11 is a view illustrating line sequential color signal obtained by thin-down scan read in the second embodiment of the electronic imaging system.
Figures 25, 26:
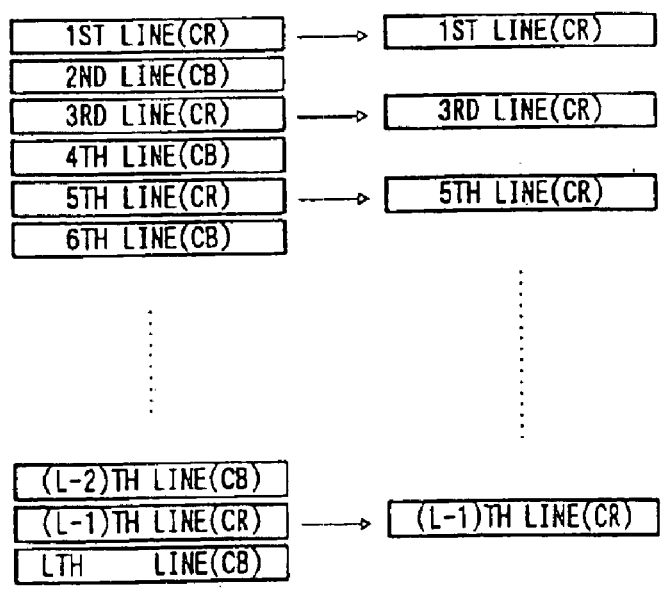
FIG. 25 is a view illustrating a Bayer array color filter in a prior art CCD.
FIG. 26 is a view illustrating thin-down scan reading of a CCD in a prior art electronic imaging system.

In the above examples in which m=3 and n=1, that is, in the case of sequential thin-down scan reading one line for every three lines, as shown in FIG. 11, the 3-rd line shown as (CR) provides R signal, and the 6-th line shown as (CB) provides B signal (see the line sequential filter configuration as shown in FIG. 25).

Since the color signal containing R data and that containing B data are obtainable as line sequential data, dynamic image processing data is obtainable by providing a simultaneous process. Such data can be used for color display on, for instance, the liquid crystal display 13, and the photographer can make framing with the same image as actually taken images.

Where a line sequential color filter comprising an array of color filters each for each line, it is thus possible to obtain data of all colors in a narrow area and improve the resolution concerning the colors.

While in the above examples m=3 and n=1, these numbers are by no means limitative, and other numbers may be selected as well. In application to a Bayer array color filter, however, it is desirable that m=2α+1 (α being a positive integer), that is, m is an odd number. In this case, it is possible to obtain versatility between the thin-down scan read case and the non-thin-down, i.e., sequential, scan read case.

Figure 12:
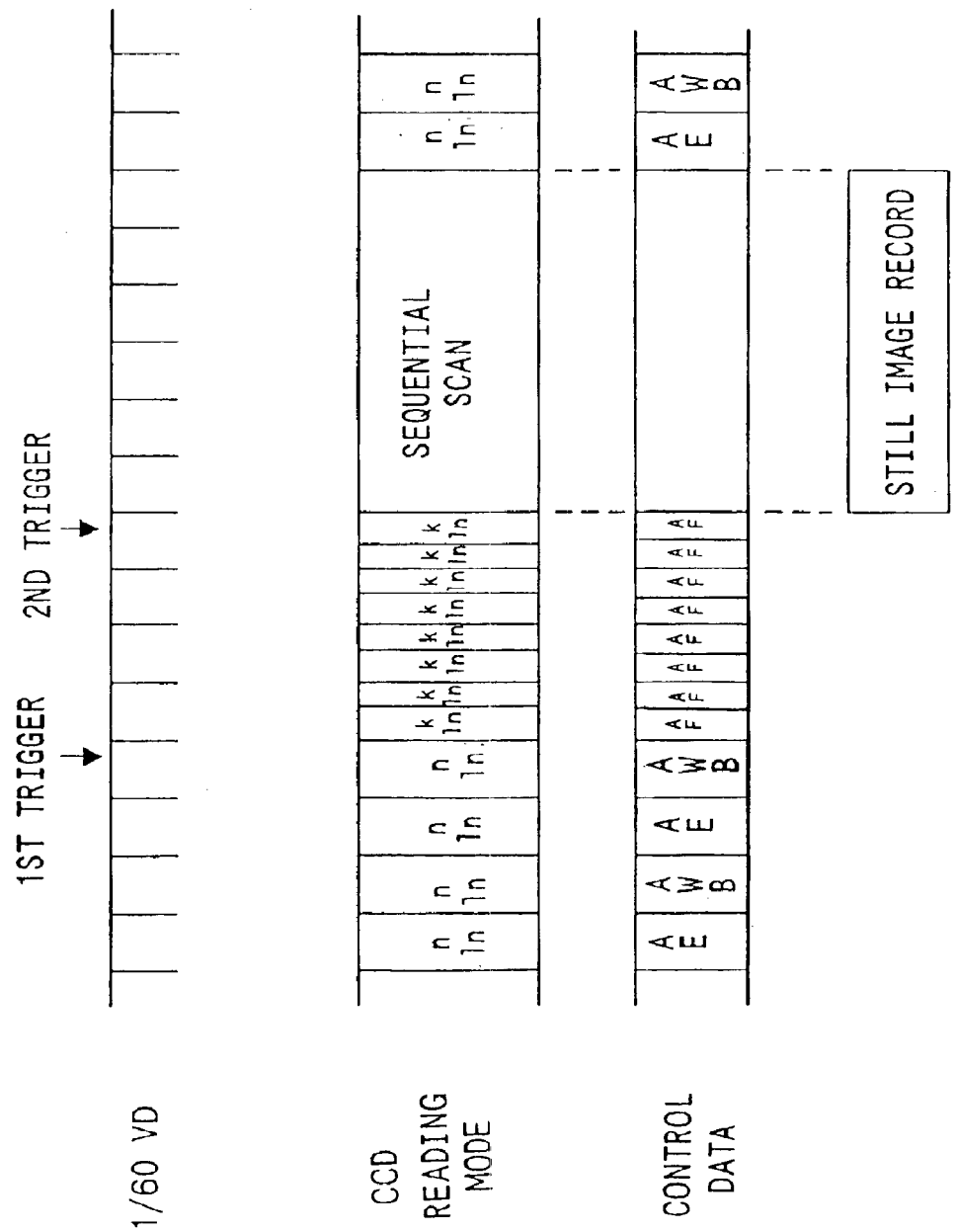
FIG. 12 is a time chart illustrating CCD read modes and control data, as well as still picture recording, in the second embodiment of the electronic imaging system.

How the modes shown in FIGS. 8(A) and 8(B) are executed, will now be described with reference to FIG. 12. FIG. 12 is a time chart illustrating CCD read modes and so forth in the electronic imaging system.

Specifically, in FIG. 12 vertical sync signal (1/60 VD) with a cycle time of 1/60 second is shown in the upper row, CCD read modes are shown in the middle row, and control data are shown in the lower row. A still picture recording time is further shown under these rows.

Normally, the mode of thin-down scan reading n lines among m lines in the whole CCD photoelectric surface area as shown in FIG. 8(A) prevails. In this mode, the image concerning the whole CCD photoelectric surface area suited for framing is displayed on the liquid crystal display 13. In this case, AE and AWB controls are made alternately.

The time chart of FIG. 12 assumes that the electronic imaging system has a two-step trigger photograph button (not shown), which can issue in its depressed state a first trigger signal representing a ready-to-record state and a second trigger signal for recording a still picture in the state held controlled by the first trigger signal.

When the first trigger signal is issued in the mode of thin-down scan reading the whole CCD photoelectric surface area as shown in FIG. 8(A), from the next frame the mode is switched over to the k line read mode as shown in FIG. 8(B). In this k line read mode, AF control is executed to reliably have focus of the lenses and the stop 17 on the subject.

After this focusing has been executed, the second trigger signal is issued to cause sequential scan read of the whole CCD lines at a frame rate of, for instance, 10 frames per second corresponding to six frames of the vertical sync signal of 1/60 second. The still picture output thus obtained is recorded in the recording medium 16.

After the still picture recording is over, the n line read mode permitting normal liquid crystal display is set to be ready for the next photographing. The AE and AWB controls are thus caused again repeatedly.

In the above method of operation, the AE and AWB controls have already been over when the first trigger signal is issued, and only the AF control may be made during the period from the appearance of the first trigger signal till the appearance of the second trigger signal. This period is further reduced because the k line read mode is set in it, so that it is possible to reduce the release time lag.

While in the above method the sole AF control is executed between the appearances of the first and second trigger signals, it is possible to make the AF and AE controls during this period.

Figure 9:
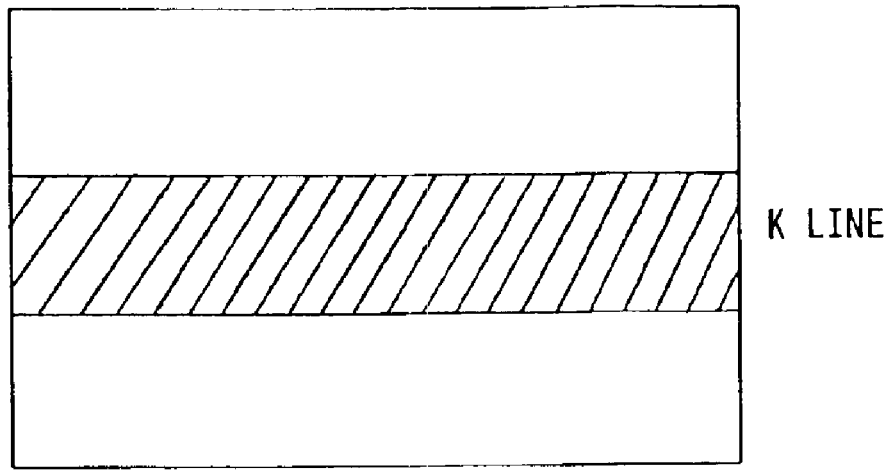
FIG. 9 is a view illustrating a k vertically continuous line block which is read out in the second embodiment of the electronic imaging system.
Figure 10:
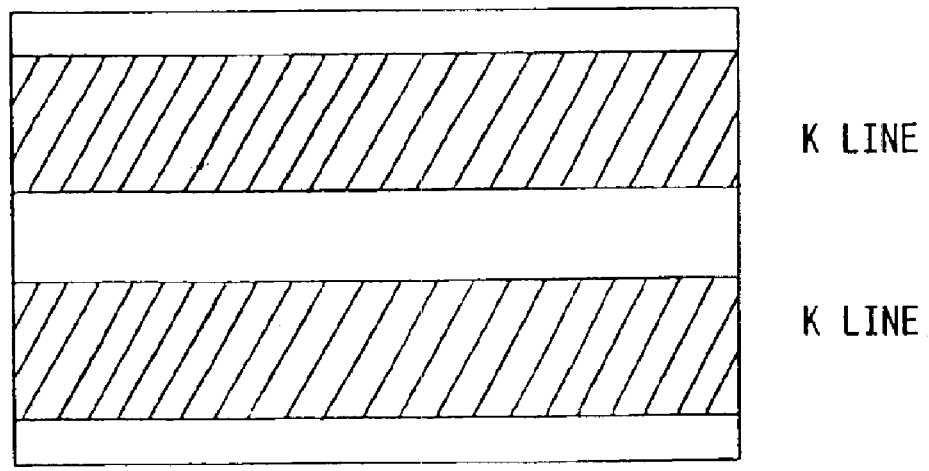
FIG. 10 is a view illustrating a case when a plurality of k vertically continuous line blocks are read out in the second embodiment of the electronic imaging system.

FIG. 10 illustrates a modification of the example shown in FIG. 9. In this modification, a plurality of k line blocks are read.

More specifically, in the example shown in FIG. 10, like the example shown in FIG. 5 described before in connection with the first embodiment, two k line blocks are set, for instance, above and below the center of the photoelectric surface area of the CCD 1. Again in this example, like the example shown in FIG. 9, the k line blocks are broader than that in the example shown in FIG. 5.

The scope for obtaining the AE and AF control data thus is further increased, so that it possible to further improve the accuracy of AF and AE.

As shown above, with the second embodiment, since broader scope data is obtainable, the accuracy of AE and AF can be further improved in addition to obtaining substantially the same effects as those of the first embodiment. In addition, color image concerning the whole CCD photoelectric surface area and suited for display on the liquid crystal display, is obtainable at a higher frame rate. An electronic imaging system is thus obtainable, which permits adequately using a plurality of different modes to provide short release time lag and be able to time shutter changes without missing.

Figure 13:
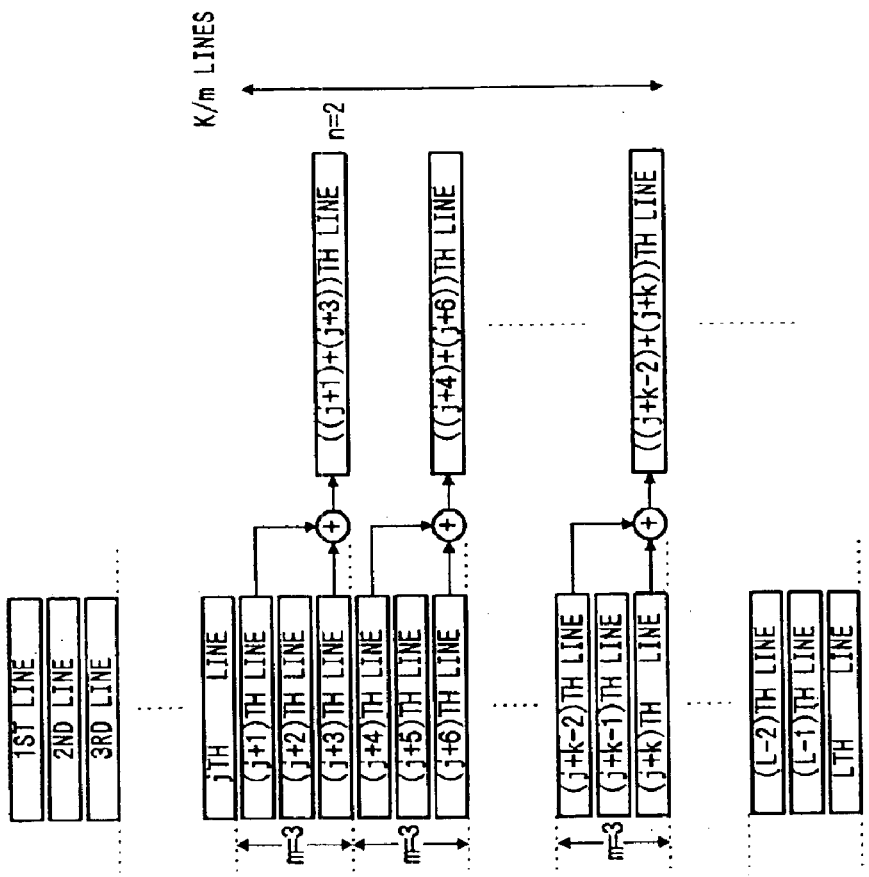
FIG. 13 is a view illustrating a method of reading out data from a CCD in a third embodiment of the electronic imaging system according to the present invention.

FIGS. 13 to 17 illustrate a third embodiment of the present invention. FIG. 13 is a view illustrating a method of reading out pixel data from CCD lines. In this third embodiment, what are like those in the preceding first and second embodiments are not described, but only what are different will be described.

The main construction of this third embodiment of the electronic imaging system is substantially the same as shown in FIG. 1.

As shown in FIG. 13, in this embodiment summed pixel signals of n (n≧2, n being an integer) lines among m (m≧3, m being an integer) lines in k (k≧6, k being an integer) continuous lines are read out. So far as one line among three lines is extracted, this embodiment is the same as the previous second embodiment. A difference resides in that data of one line that is extracted is obtained by adding together data of, for instance, two among three lines. The frame rate is the same as in the second embodiment.

More specifically, for reading out the image data from the CCD 1, the embodiment has, in addition to the still picture recording mode for taking a high quality picture by sequential scan read of the whole CCD lines from the 1-st to the L-th line as shown in FIG. 2(A), a mode of reading out pixel signal sums each of n lines among m lines as shown in FIG. 15(A), and a mode of reading out pixel signal sums of n lines among m lines in k continuous lines as shown in FIG. 15(B), these modes being selectable.

Figure 14:
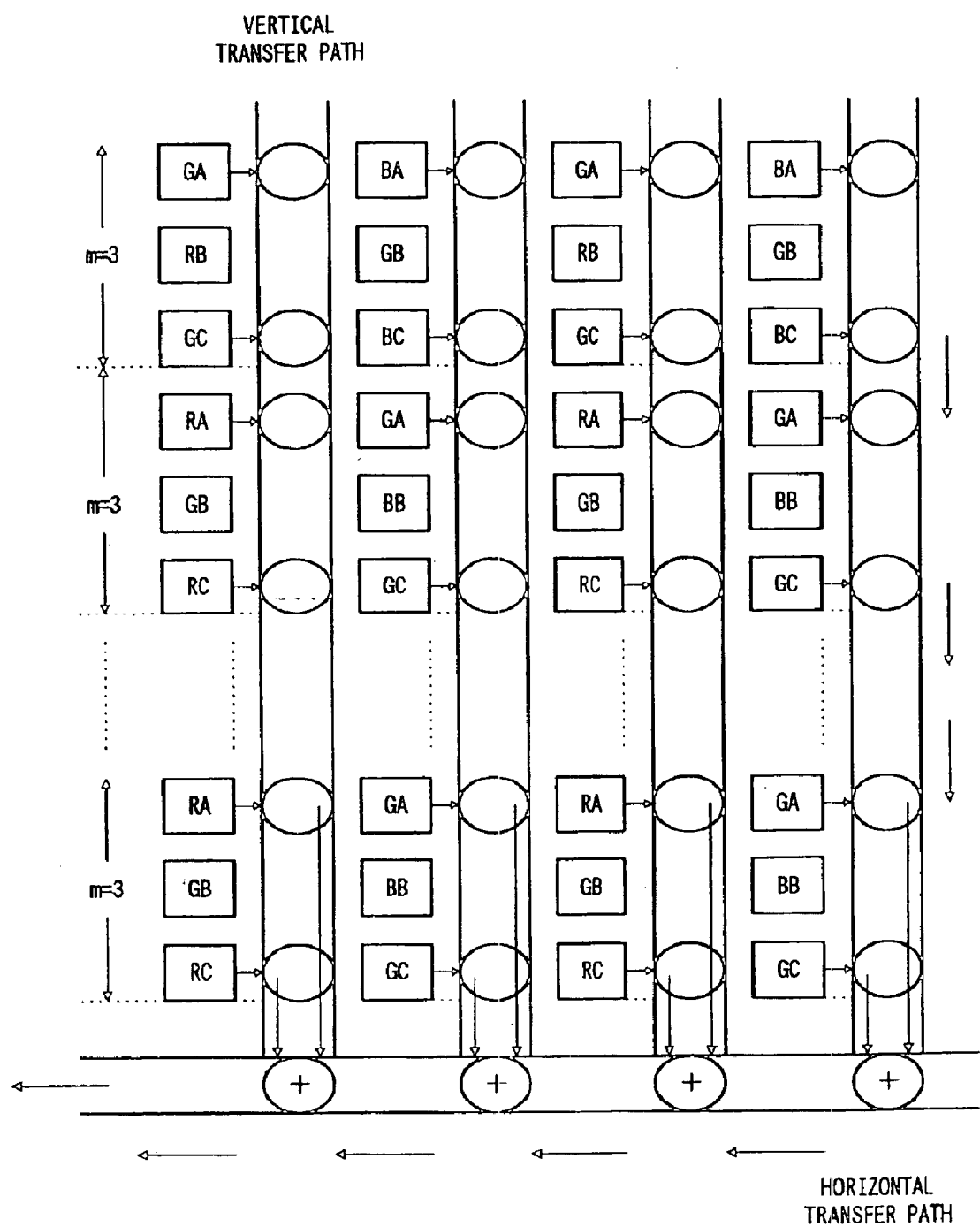
FIG. 14 is a view illustrating plural line signal charge addition in the third embodiment of the electronic imaging system.
Figure 15:
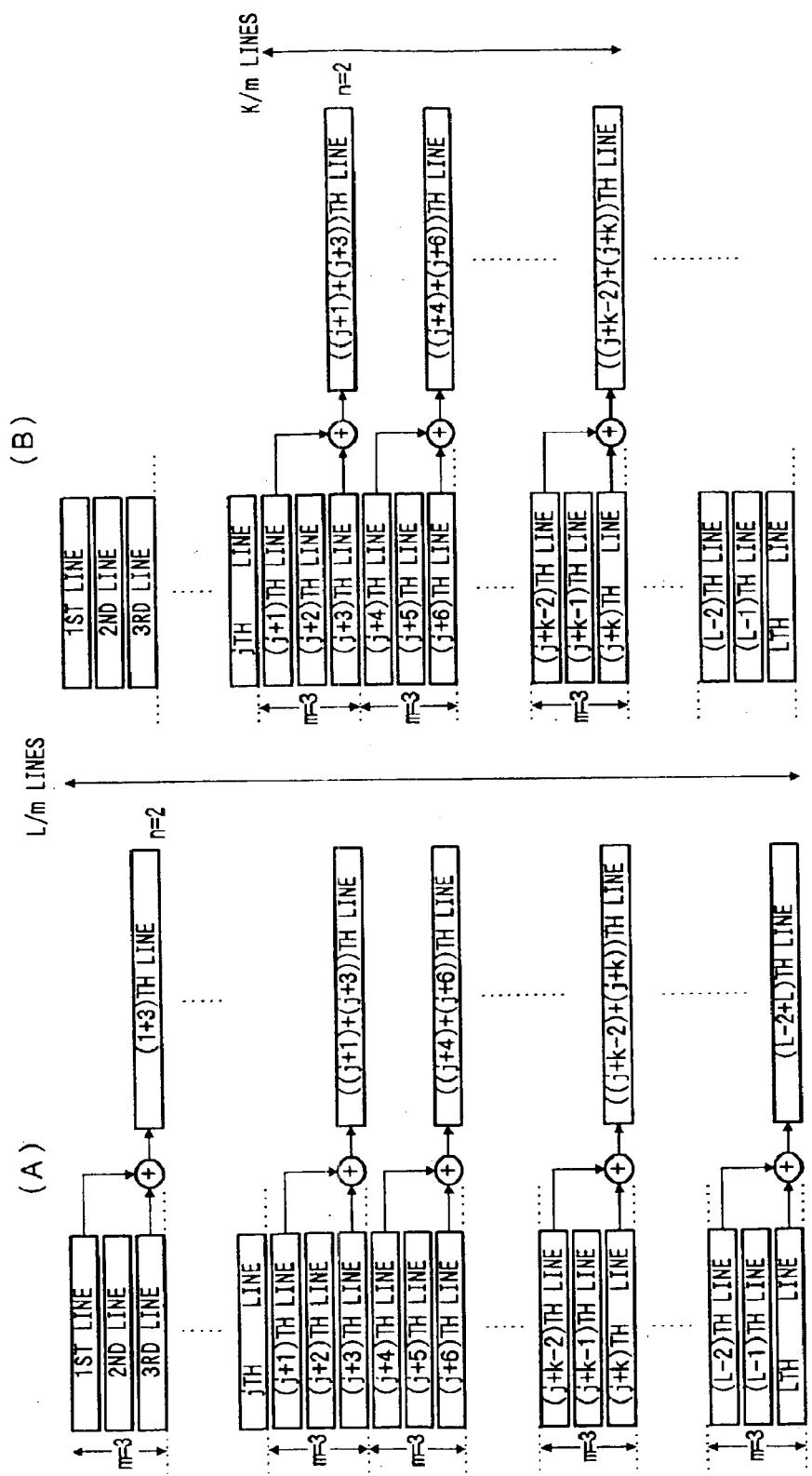
FIGS. 15(A) and 15(B) are views illustrating CCD read modes in the third embodiment of the electronic imaging system.

The addition of pixel signals of a plurality of lines will now be described with reference to FIG. 14. FIG. 14 is a view illustrating signal addition, which is made when signals are transferred in an inter-line CCD.

Referring to FIG. 14, labeled GA, GB, GC, BA, BB, BC and RA, RB and RC are photo-diodes. Lanes shown adjacent the right side of the photo-diode columns represent vertical transfer paths. A horizontal lane extending under the lower ends of the vertical transfer paths represents a horizontal transfer path.

FIG. 14 assumes a case where m=3 and n=2. That is, in this example one line is extracted by adding together signals of two among three lines.

At the end of exposure, charge signals are transferred from the photo-diodes to the vertical transfer paths.

Specifically, charge signals shown as ovals in the Figure are transferred from the photo-diodes GA, GC, BA, BC, RA and RC to the vertical transfer paths.

The transferred charge signals are transferred along the vertical transfer paths toward the horizontal transfer path. The vertical transfer is executed in units each of three times because of m=3 as noted above. In this way, the charge signals from the photo-diodes GA, BA, RA, GC, BC and RC are added together.

For example, in the left bottom portion labeled m=3 in FIG. 14, charge signals are transferred from the two photo-diodes RA and RC among the three photo-diodes RA, GB and RC to the associated vertical transfer path.

In each unit transfer, these charge signals are transferred along the vertical transfer path. In the first time of the unit transfer, the charge signal of the photo-diode RC is transferred to the horizontal transfer path, and the charge signal of the photo-diode RA is transferred to the position, which was assigned at the outset to charge signal of the photo-diode GB although no charge signal is transferred therefrom.

In the second time of the unit transfer, the charge signal of the photo-diode RC remains in the horizontal transfer path, and the charge signal of the photo-diode RA is transferred to the vertical transfer path position, which was assigned at the outset to the charge signal from the photo-diode RA.

In the third time of the unit transfer, the charge signal of the photo-diode RC still remains in the horizontal transfer path, and the charge signal of the photo-diode RA is transferred to the horizontal transfer path. In consequence, the charge signals from the photo-diodes RA and RC are added together.

The charge signals added together are sequentially read out from the horizontal transfer path, whereby a signal of one line can be read out.

After one line signal has thus been read out, the sum of charge signals of two among the next three lines is read out. In this way, successive charge signal sums are read out.

Figure 16:
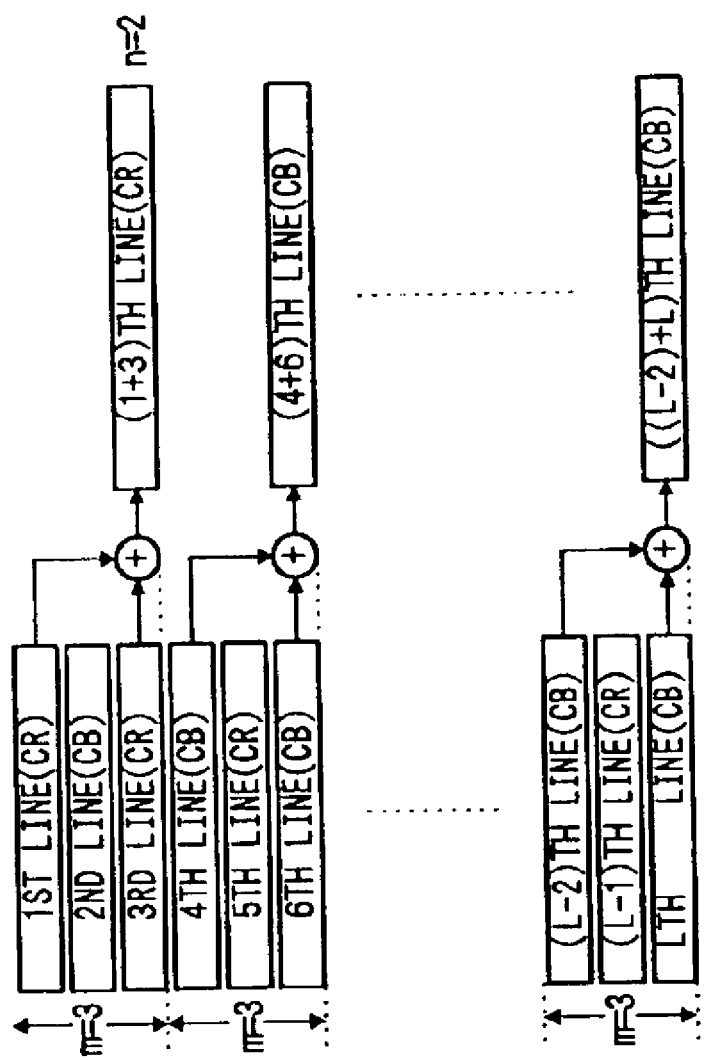
FIG. 16 is a view illustrating line sequential color signal obtained in the third embodiment of the electronic imaging system.

When this addition method is used in a line sequential Bayer array filter, as shown in FIG. 16, signals of the 1-st and 3-rd lines, which are CR lines containing R data, are added together and provided, and then signals of the 4-th and 6-th lines, which are CB lines containing B data, are added together and provided. In this way, line outputs containing R data and those containing B data are obtained alternately. It is thus possible to obtain line sequential color signal.

For displaying signals on the liquid crystal display 13 or the like, interpolation of the lines containing R and B data is executed in a simultaneous process. In this process, highly correlative data can be obtained because the 3-rd line containing R data and the 4-th line containing B data as shown in FIG. 25 are adjacent to each other on the CCD. Satisfactory image quality signal is thus obtainable even with few lines.

In a solid-state image sensor having color filters in the above Bayer array, it is desirable that m=2α+1 (α being a positive integer), that is, m is an odd number, for adding together signals of the same color and obtaining line sequential color signal.

FIGS. 13, 15(A) and 15(B) illustrate examples in which, like the example shown in FIG. 14, m=3 and n=2.

FIG. 15(A) illustrates a mode, which is set when obtaining image data concerning the whole CCD photoelectric surface area and used for liquid crystal display or like purpose.

Specifically, in the whole CCD lines from 1-st to L-th line, signals of 1-st and 3-rd ones of three, i.e., 1-st to 3-rd, lines are addition read out. Then, signals of 4-th and 6-th ones of three, i.e., 4-th to 6-th, lines are addition read out.

In this way, signals are sequentially addition read out up to those of (L−2)-th and L-th ones of three, i.e., (L−2)-th, (L−1)-th and L-th, lines. In this mode, L/m lines are read.

A mode as shown in FIG. 13 or 15(B) is set when obtaining high frame rate image data for AF, AE, AWB and so forth control processes.

Specifically, in k continuous CCD lines from (j+1)-th to (j+k)-th line, signals of (j+1)-th and (j+3)-th ones of three, i.e., (j+1)-th to (j+3)-th, lines are addition read out. Then, signals of (j+4)-th and (j+6)-th ones of three, i.e., (j+4)-th to (j+6)-th, lines are addition read out. In this way, signals are sequentially addition read out up to those of (j+k−2)-th and (j+k)-th ones of three, i.e., (j+k−2)-th to (j+k)-th, lines. In this mode, k/m lines are read out.

Figure 17:
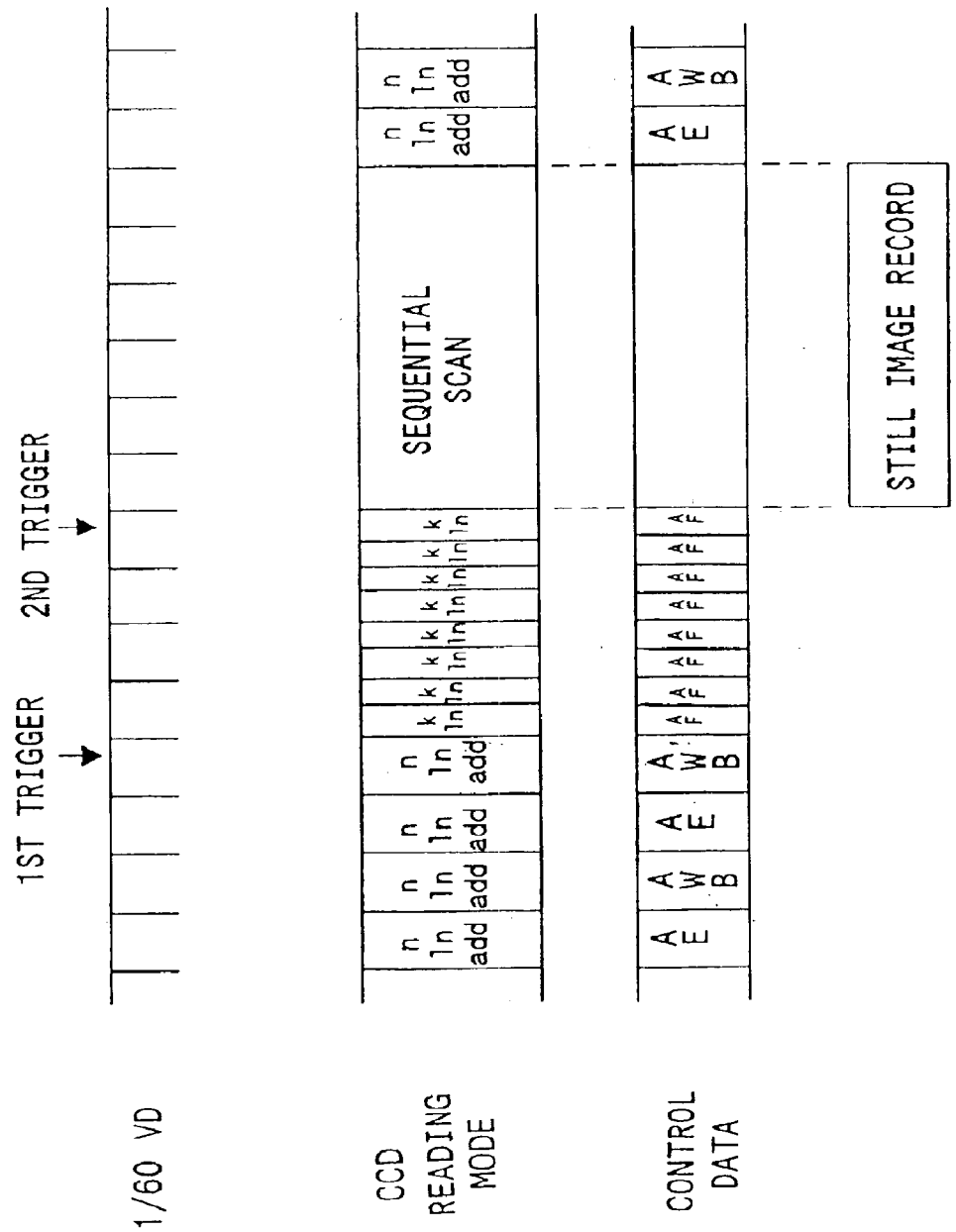
FIG. 17 is a time chart illustrating CCD read modes and control data, as well as still picture recording, in the third embodiment of the electronic imaging system.

FIG. 17 is a time chart illustrating CCD read modes and so forth in the electronic imaging system.

The time chart shown in FIG. 17 is basically the same as that shown in FIG. 12. A sole difference is that in the CCD read mode for obtaining data for liquid crystal display or like purpose, signals of n lines are addition read out.

Normally, the mode as shown in FIG. 15(A) is set for making liquid crystal display or the like by making alternate AE and AWB controls each in each frame.

When the first trigger signal is issued, the k line read mode as shown in FIG. 15(B) is set for AF control.

When the subsequent second trigger signal is issued, the whole CCD lines are sequentially scanned for recording a still picture in the recording medium 16.

As a modification of this embodiment, like the case shown in FIG. 10, a plurality of k line blocks may be read.

As shown above, the third embodiment permits to obtain, in addition to effects substantially like those obtainable with the previous first and second embodiments, an effect that it is possible to increase the dynamic range and reduce moire or like adverse effects because plural line signals are addition read out and provided.

Figure 18:
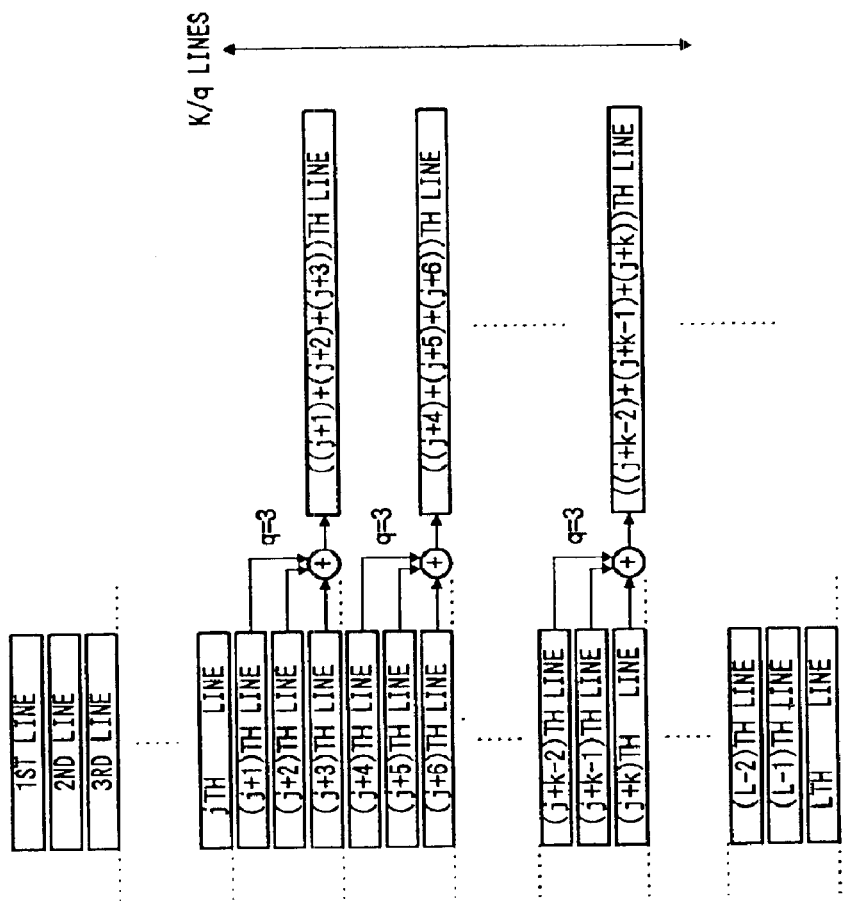
FIG. 18 is a view illustrating a method of reading out image data from CCD lines in a fourth embodiment of the electronic imaging system according to the present invention.

FIGS. 18 to 23 illustrate a fourth embodiment of the present invention. FIG. 18 is a view illustrating a method of reading out pixel data from CCD lines. In this fourth embodiment, what are like those in the previous first to third embodiments are not described, but only what are different will be described.

The main construction of this fourth embodiment of the electronic imaging system is substantially the same as shown in FIG. 1.

As shown in FIG. 18, in this embodiment pixel signal sums each of all of q (q≧3, q being an integer) in k (k≧6, k being an integer) continuous lines are read out. So far as one line is extracted for every three lines, this embodiment is the same as the previous second and third embodiments. A difference resides in that data of one line that is obtained is extracted by adding together data of all three lines. The frame rate is the same as in the second and third embodiments.

More specifically, for reading out the image data from the CCD 1, the embodiment has, in addition to the still picture recording mode for taking a high quality picture by sequential scan read of the whole CCD lines from the 1-st to the L-th line as shown in FIG. 2(A), a mode for reading out pixel signals of n lines among m lines as shown in FIG. 20(A), and a mode for reading out pixel signal sums each of q lines in k continuous lines as shown ii FIG. 20(B). These modes are selectable.

Figure 19:
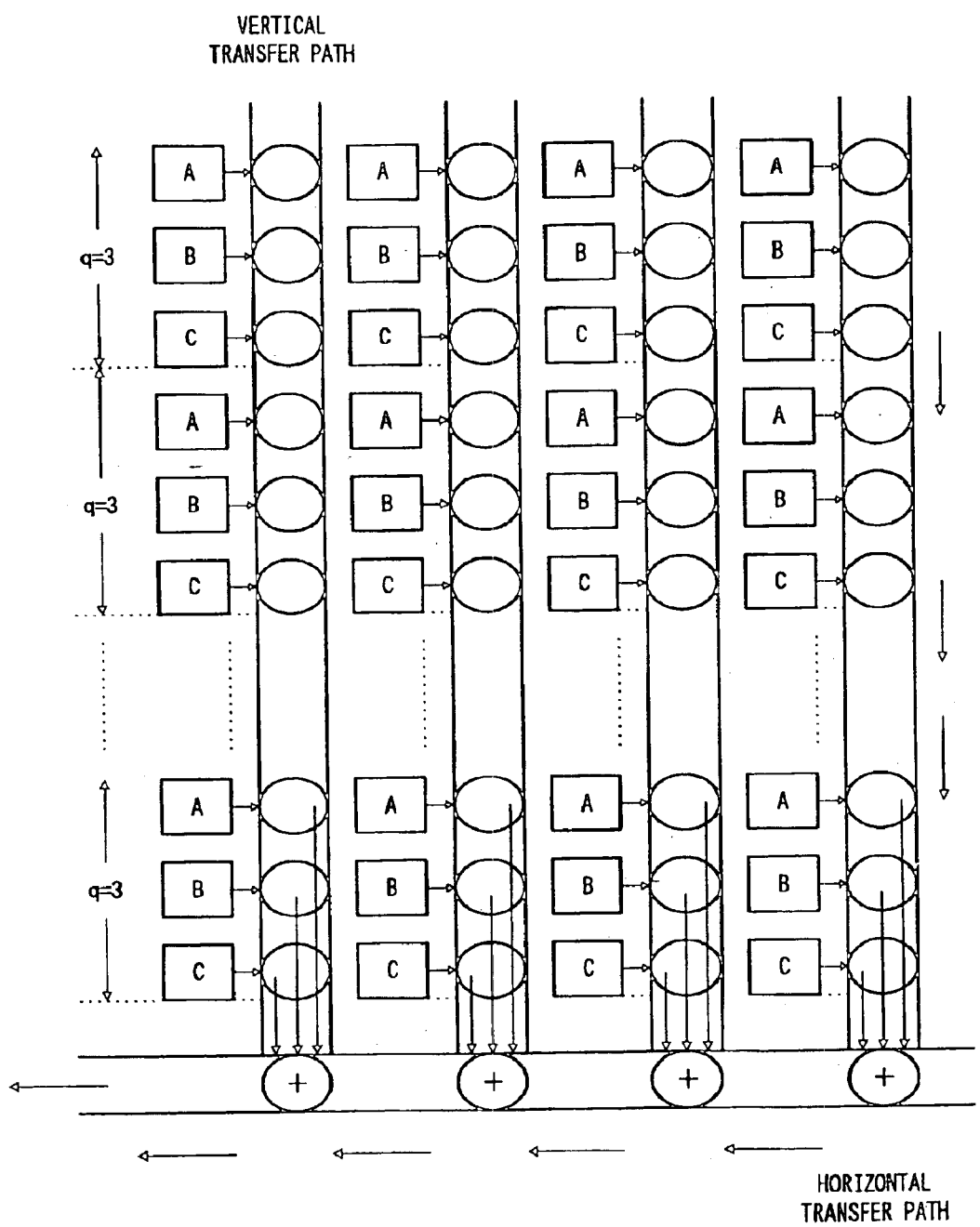
FIG. 19 is a view illustrating plural line signal charge addition in the fourth embodiment of the electronic imaging system.
Figure 20:
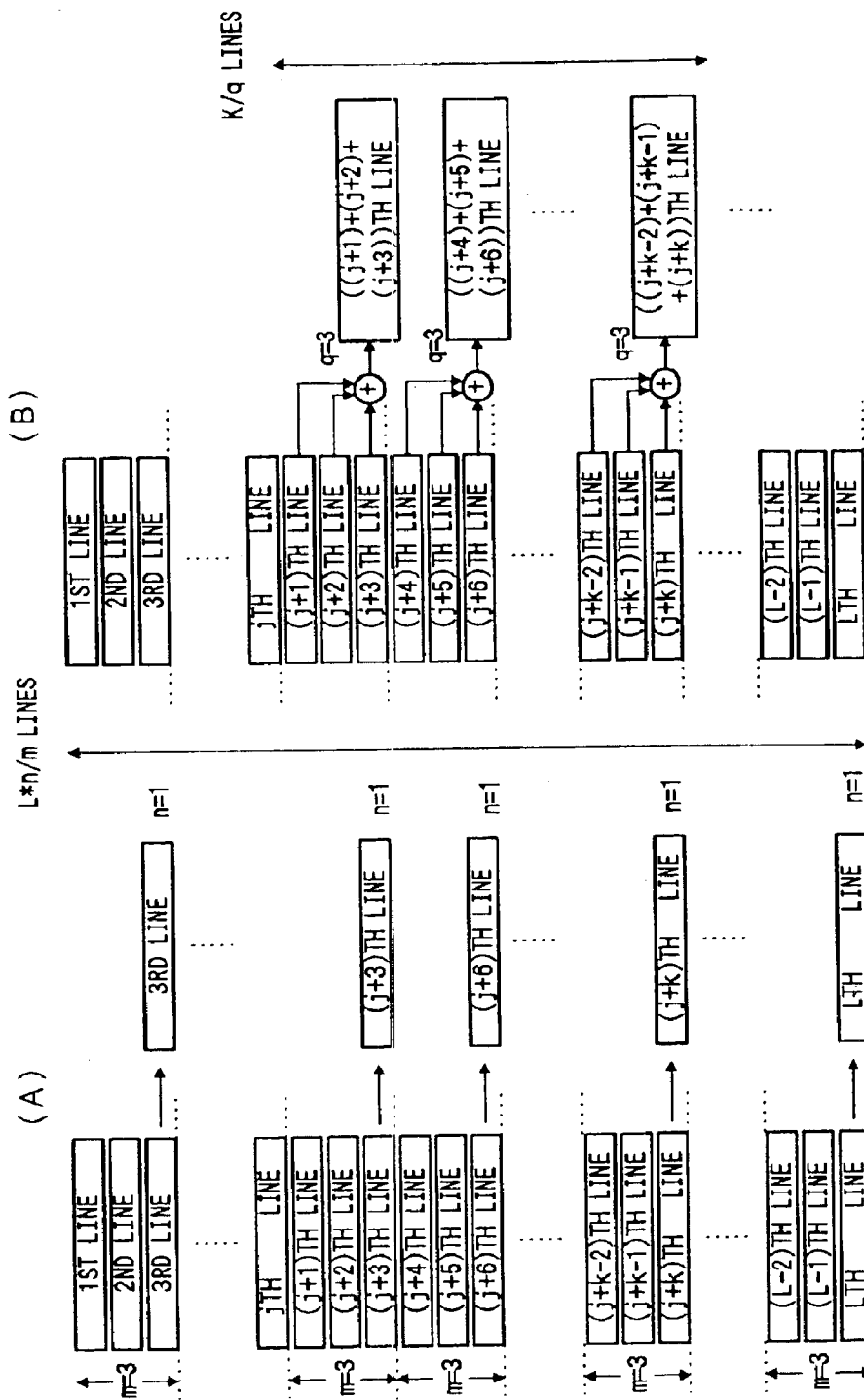
FIGS. 20(A) and 20(B) are views illustrating CCD read modes in the fourth embodiment of the electronic imaging system.
Figure 21:
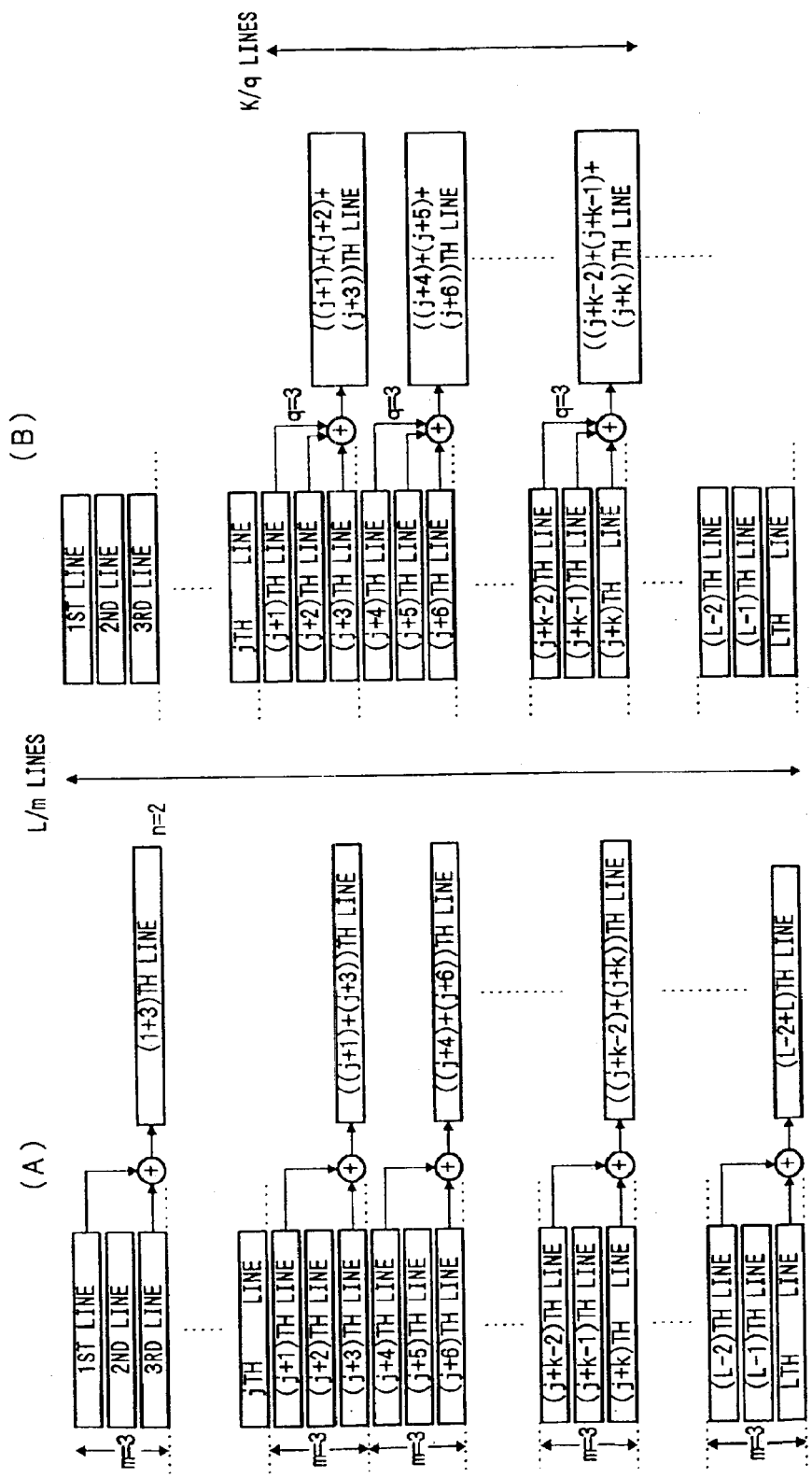
FIGS. 21(A) and 21(B) are views showing other CCD read modes in the fourth embodiment of the electronic imaging system.

The addition of pixel signals of a plurality of lines will be described with reference to FIG. 19. FIG. 19 is a view illustrating signal addition, which is made when signals are transferred to in an inter-line CCD.

Referring to FIG. 19, labeled A, B and C are photo-diodes. The vertical and horizontal transfer paths are the same as those shown in FIG. 14.

FIG. 19 assumes a case where q=3, that is, signals of three lines are added together.

At the end of exposure, charge signals are transferred from the photo-diodes to the vertical transfer paths. Specifically, charge signals shown as ovals in the Figure are transferred from all the photo-diodes, i.e., all the photo-diodes A, B and C, to the vertical transfer paths.

The transferred charge signals are transferred along the vertical transfer paths toward the horizontal transfer path. The vertical transfer is executed in units each of three times because of q=3 noted above. In this way, the charge signals from the photo-diodes A, B and C are added together.

The charge signals of the three photo-diodes A, B and C thus added together, are sequentially read out from the horizontal transfer path to obtain one line signal.

After one line signal has thus been read out, the next line signal is read out in the same way. In this way, successive line signals are each read out from three lines.

Signals obtained when q=4 is set, will now be described in connection with a line sequential Bayer array filter construction.

Figure 22:
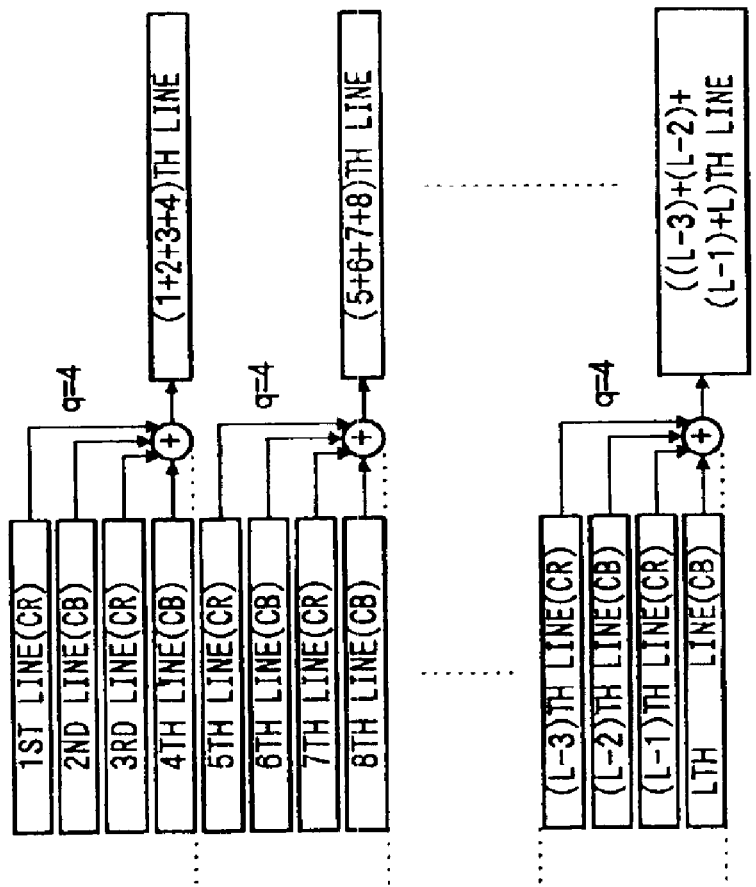
FIG. 22 is a view illustrating that a signal close to luminance signal is obtainable by q addition in the fourth embodiment of the electronic imaging system.

As shown in FIG. 22, when signals of the 1-st and 3-rd lines which are CR lines containing R and G data and signals of the 2-nd and 4-th lines which are CR lines containing B and G data are added together, a signal (R+2G+B)×2 is calculated.

The signal is very close to commonly termed luminance signal. In addition, since it is obtained by adding together signals of a plurality of lines, it permits increasing the dynamic range and reducing adverse effects of moire.

Thus, this sum signal can be used as very effective signal for the auto-focus, exposure or like control which may not require color signal.

Figure 23:
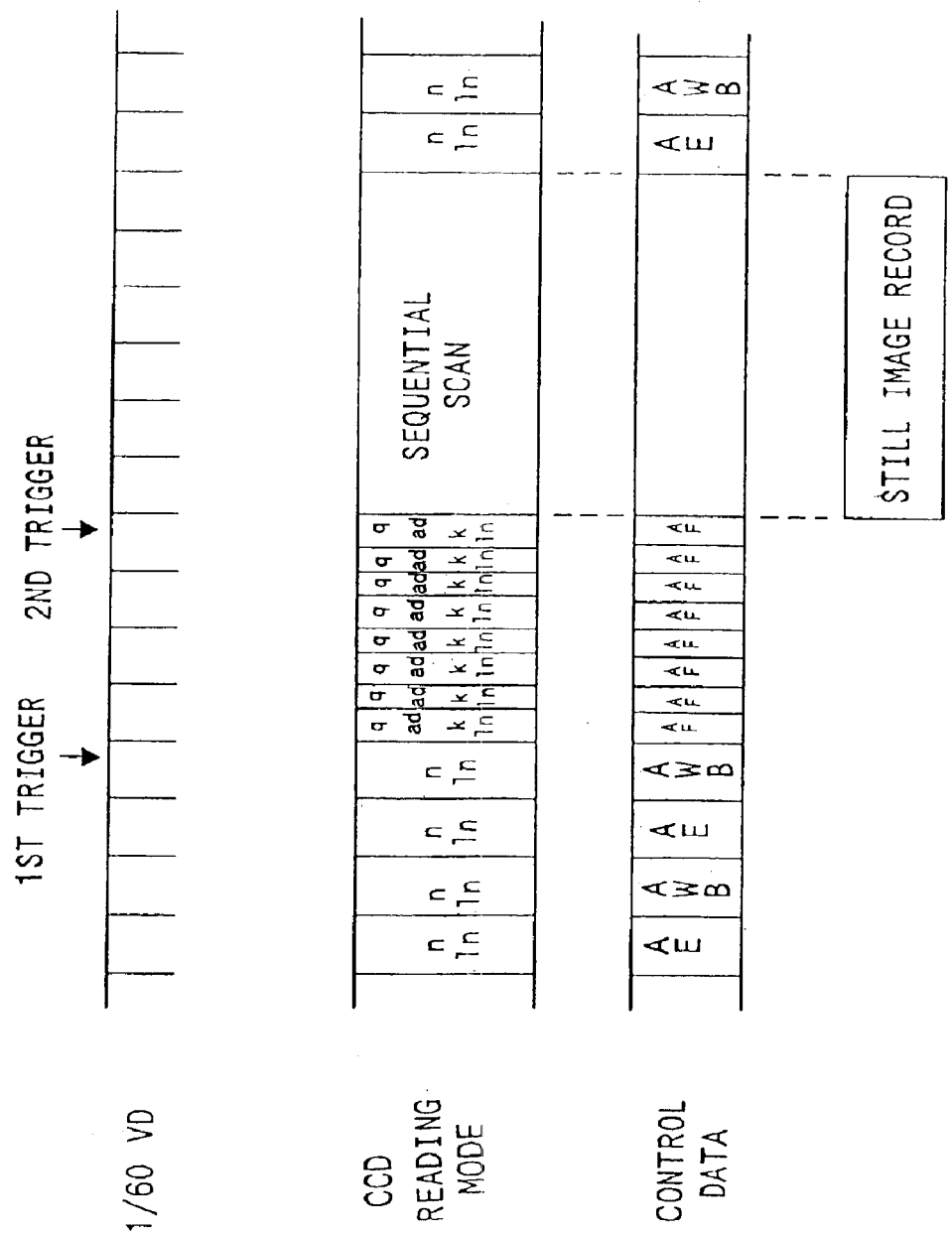
FIG. 23 is a time chart illustrating CCD read modes and control signal, as well as still picture recording, in the fourth embodiment of the electronic imaging system.

FIG. 23 is a time chart illustrating CCD read modes and so forth in the electronic imaging system.

What is shown in FIG. 23 is basically the same as what is shown in FIG. 12 except for that the CCD read mode for AF control after the first trigger signal has been issued is a mode of reading out q line sum signals in k continuous lines.

Normally, the mode as shown in FIG. 20(A) is set for making liquid crystal display or the like by making alternate AE and AWB controls each in each frame. In the mode shown in FIG. 20(A), signal suited for the AWB or like control is obtainable because in this made it is possible to obtain line sequential color signal.

When the first trigger signal is issued, the mode of reading out q line signal sums in k continuous lines is set for AF control. In the mode shown in FIG. 20(B), signal suitable for the AF or like control is obtainable because in this mode it is possible to obtain a signal close to the luminance signal.

When the subsequent second trigger signal is issued, the whole CCD lines are sequentially scanned for recording a still picture in the recording medium 16.

FIGS. 21(A) and 21(B) illustrate an alternative to the above example shown in FIGS. 20(A) and 20(B). Specifically, for reading out pixel data from the CCD 1, this example has, in addition to the still picture recording mode for taking a high quality picture by sequential scan read of the whole CCD lines from the 1-st to the L-th line as shown in FIG. 2(A), a mode for reading out signal sums each of n (n≧2, n being an integer) lies among m (m≧2, m being an integer) lines, and a mode for reading out signals sums each of q (q≧3, q being an integer) lines in k continuous lines, these modes being selectable.

Thus, in the mode for reading out signal sums each of n lines among m lines it is possible to obtain a line sequential output suited for liquid crystal display or like purpose, and in the mode for reading out signal sums each of q lines in k continuous lines it is possible to obtain a signal close to the luminance signal. Adequate modes thus can be selected in dependence on purposes by deftly combining color addition filters in a line sequential filter.

As a modification of this embodiment, like the case shown in FIG. 10, a plurality of k line blocks may be read.

As shown above, the fourth embodiment permits to obtain, in addition to the effects substantially like those obtainable with the previous first to third embodiments, effects that a signal close to the luminance signal is obtainable for AF or like control after the issuance of the first trigger signal and that it is possible to improve the accuracy of AF and the minimum subject illumination intensity necessary for AF owing to increase of the dynamic range of signal.

As has been described in the foregoing, with the electronic imaging system according to the present invention, in general, the following advantages are obtainable.

The frame rate can be improved to (whole line number)/k times compared to the case of sequential scan reading the whole lines. It is thus possible to provide an electronic imaging system, which can provide a solid-state image sensor output at an increased frame rate without use of any high drive frequency.

The frame rate can be improved to (m/n)×(whole line number)/k times compared to the case of sequential scan reading the whole lines. In addition, by thinning down lines it is possible to obtain pixel signals concerning a broader area without fame rate sacrifice. It is thus possible to provide an electronic imaging system, which can provide a solid-state image sensor output at an increased frame rate without use of any high drive frequency.

The frame rate can be improved to (m×(whole line number)/k times compared to the case of sequential scan reading the whole lines. In addition, by n line addition it is possible to obtain increased dynamic range data as the solid-state image sensor output. It is also possible to obtain pixel signals concerning a broader area without frame rate sacrifice. It is thus possible to provide an electronic imaging system, which can provide a solid-state image sensor output at an increased frame rate without use of any high drive frequency.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. An electronic imaging system comprising:
   a solid-state image sensor having a two-dimensional array of pixels capable of converting light incident thereon to electric signal, the pixels being arranged in a plurality of horizontal lines, the lines being arranged vertically one under another;

a color filter arranged on an incident plane of the solid-state image sensor having a line sequential primary color mosaic pattern; and a controller, said controller constructed to selectively control a mode for sequential scan reading out pixel signals concerning the whole pixels of the solid-state image sensor for still picture recording, a mode for reading out pixel signal sums by utilizing a plurality of vertical registers each of n (n>2, n being an integer) lines among m (m>3, m being an integer) lines of the solid-state image sensor for said still picture recording or dynamic image processing, and a mode for reading out pixel signal sums by utilizing a plurality of vertical registers of n lines among m lines in k (k>6, k being an integer) partially continuous lines of the solid-state image sensor for said still picture recording or said dynamic image processing.

2. The electronic imaging system as set forth in claim 1, wherein the controller controls a mode of reading a plurality of k line blocks each of k lines in the whole lines for said still picture recording or dynamic image processing.

3. The electronic imaging system as set forth in claim 1 wherein image data obtained by reading out said pixel signal sums said each of n lines among m vertically continuous lines for said still picture recording or said dynamic image processing, is such that its color signal is line sequential data.

4. The electronic imaging system as set forth in claim 1 wherein the n lines for addition are constituted by the same color filter.

5. The electronic imaging system as set forth in claim 4, wherein m=2α+1 (α being a positive integer).

6. The electronic imaging system as set forth in claim 1 wherein the n addition lines are constituted by the same color filter, and different n line addition filters are provided for every said m lines.

7. The electronic imaging system as set forth in claim 1 wherein dynamic image processed signal obtained in either of the modes is used for AF, AE or AWB control data.

8. The electronic imaging system as set forth in claim 1 wherein dynamic image processed signal obtained in either of the modes is used as AF, AE or AWB control data, and the AF, AE or AWB control data is calculated sequentially each in each frame.

9. The electronic imaging system as set forth in claim 1, wherein the controller selects a mode of reading out pixel signal sums each of n lines among m vertically continuous lines when obtaining dynamic image processed signal to be displayed on a display provided in, the system to be supplied to an external display provided outside the system or to be used as AE or AWB control data, and the control means selects a mode of reading out pixel signals of n lines among every m vertically continuous lines in k partially continuous lines when obtaining dynamic image processed signal to be used as AF or AE control data.

10. A controller for reading out color image signal from a destructive read-out type imager with a primary color Bayer filter, said controller comprising:

a mode selector unit configured to select one of plural read-out modes according to usage of said color image signal read from the imager, said read-out modes including:

(a) a mode for reading out gamut of the imager for use with recording a still picture;

(b) a mode for reading out with summing every first and third lines of three to be read-out within the gamut of the imager for use with controlling AE and AWB function; and (c) a mode for reading out with summing of first and third lines to be read-out within partial imaging area of the imager for use with controlling AF function.

11. A method of reading out color image signal from a destructive read-out type imager with a primary color Bayer filter, comprising:

selecting one of plural read-out modes according to usage of said color image signal read out from the imager, said read-out modes including:

(a) a mode for reading out gamut of the imager for use with recording a still picture;

(b) a mode for reading out with summing every first and third lines of three to be read-out within gamut of the imager for use with controlling AE and AWB function; and (c) a mode for reading out with summing of first and third lines to be read-out within partial imaging area of the imager for use with controlling AF function.

* * * * *